(12) United States Patent
Cunningham et al.

(10) Patent No.: US 11,066,062 B2
(45) Date of Patent: Jul. 20, 2021

(54) SYSTEMS AND METHODS FOR REDUCING ENGINE COMPRESSION TORQUE

(71) Applicant: Ford Global Technologies, LLC, Dearborn, MI (US)

(72) Inventors: Ralph Wayne Cunningham, Milan, MI (US); Joseph Ulrey, St. Joseph, MI (US); William Cary Cole, Wixom, MI (US); Brad Boyer, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 16/165,855

(22) Filed: Oct. 19, 2018

(65) Prior Publication Data
US 2020/0122709 A1 Apr. 23, 2020

(51) Int. Cl.
*B60W 20/10* (2016.01)
*F02M 26/15* (2016.01)
*F02D 41/00* (2006.01)
*F02M 26/17* (2016.01)
(Continued)

(52) U.S. Cl.
CPC .............. *B60W 20/10* (2013.01); *B60K 6/24* (2013.01); *B60K 6/40* (2013.01); *F01N 13/10* (2013.01);
(Continued)

(58) Field of Classification Search
CPC ............. B60W 20/10; B60W 2540/10; B60W 2540/12; B60W 10/08; B60W 20/15; B60W 10/06; B60W 2710/06; F02M 26/15; F02M 26/17; F02M 35/10222; B60Y 2200/92; B60Y 2300/437; B60K 6/485; B60K 6/40; B60K 6/24; F02D 23/00; F02D 29/02; F02D 13/0207; F02D 41/0235; F02D 41/123; F02D 41/0007; F02D 41/0052; F02D 41/0077; F02D 41/0225; F02D 41/042; F02D 2250/18; F02D 2200/501; F02D 2200/101; F02D 2200/602; F02D 2200/0406; F02D 2200/021; F02D 41/005; F02D 41/0087; F02D 13/0276; F02D 13/0257; F02D 13/0203; F02B 25/145;
(Continued)

(56) References Cited

U.S. PATENT DOCUMENTS 6,161,521 A 12/2000 Russ et al.
7,930,087 B2 4/2011 Gibson et al.
(Continued)

*Primary Examiner* — Joseph J Dallo
*Assistant Examiner* — Kurt Philip Liethen
(74) *Attorney, Agent, or Firm* — Geoffrey Brumbaugh; McCoy Russell LLP

(57) ABSTRACT

Methods and systems are provided for reducing engine compression torque when an engine having a split exhaust system is spun unfueled. In one example, a method may include maintaining closed a blowdown exhaust valve of a cylinder, the blowdown exhaust valve coupled to a first exhaust manifold that directs gases from the cylinder to a catalyst, and opening a scavenge exhaust valve of the cylinder, the scavenge exhaust valve coupled to a second exhaust manifold that directs gases from the cylinder to an exhaust gas recirculation system. In this way, compression of gases within they cylinder is reduced while gas flow to the catalyst is prevented.

19 Claims, 8 Drawing Sheets

(51) Int. Cl.
  *F02M 35/10* (2006.01)
  *F02D 13/02* (2006.01)
  *B60K 6/40* (2007.10)
  *B60K 6/24* (2007.10)
  *F01N 13/10* (2010.01)

(52) U.S. Cl.
  CPC ..... *F02D 13/0203* (2013.01); *F02D 13/0257* (2013.01); *F02D 13/0276* (2013.01); *F02D 41/005* (2013.01); *F02D 41/0087* (2013.01); *F02M 26/15* (2016.02); *F02M 26/17* (2016.02); *F02M 35/10222* (2013.01); *B60W 2540/10* (2013.01); *B60W 2540/12* (2013.01); *B60W 2710/06* (2013.01); *B60Y 2200/92* (2013.01); *F01N 2590/11* (2013.01)

(58) Field of Classification Search
  CPC . Y02T 10/40; F01N 2900/08; F01N 2900/10; F01N 9/00; F01N 2430/10; F01N 13/107; F01N 13/10; F01N 2590/11
  See application file for complete search history.

(56) References Cited

U.S. PATENT DOCUMENTS

| | | | |
|---|---|---|---|
| 8,997,484 B2 | 4/2015 | Rollinger et al. | |
| 9,080,523 B1* | 7/2015 | Ulrey | F02D 41/006 |
| 9,279,396 B2 | 3/2016 | Rollinger et al. | |
| 9,346,451 B2* | 5/2016 | Ulrey | B60W 10/06 |
| 9,382,838 B2 | 7/2016 | Rollinger et al. | |
| 9,528,429 B2 | 12/2016 | Rollinger et al. | |
| 2013/0305709 A1 | 11/2013 | Rollinger et al. | |
| 2013/0311068 A1 | 11/2013 | Rollinger et al. | |
| 2014/0378273 A1 | 12/2014 | Gibson et al. | |
| 2015/0316005 A1* | 11/2015 | Madison | F01L 13/0042 60/602 |
| 2016/0076470 A1* | 3/2016 | Takamiya | F02D 41/0002 123/676 |
| 2016/0160710 A1* | 6/2016 | Roth | F01L 9/20 123/90.11 |
| 2017/0204761 A1* | 7/2017 | Ulrey | F02D 41/0005 |
| 2017/0309692 A1* | 10/2017 | Choi | H01L 27/3246 |

* cited by examiner

//  SYSTEMS AND METHODS FOR REDUCING ENGINE COMPRESSION TORQUE

FIELD

The present description relates generally to methods and systems for controlling a vehicle engine to reduce engine torque oscillations while spinning the engine unfueled.

BACKGROUND/SUMMARY

An engine may be included in a hybrid vehicle powertrain that further includes an electric machine. Such hybrid vehicle systems may increase fuel economy via regenerative braking, electric creep, and/or light launch. However, to employ these features, a transmission of the vehicle must be in-gear, and some hybrid vehicle architectures, such as P0 and P1 architectures, do not enable the engine to be decoupled from the electric machine. Therefore, spinning the electric machine for regenerative braking, electric creep, and light launch also spins the engine, making low speed regenerative braking, electric creep, and light launch uncomfortable for vehicle occupants due to engine torque oscillations. For example, compression torque caused by the compression of gases within engine cylinders (e.g., during the compression stroke) and the resulting expansion (e.g., during the power stroke) may cause the powertrain to accelerate and decelerate. As a result, certain hybrid vehicle architectures (e.g., P0 and P1) are unable to use regenerative braking, electric creep, and/or light launch at low engine speeds, resulting in reduced fuel economy.

Other attempts to reduce compression torque while an engine is spun unfueled include reducing airflow through the engine. One example approach is shown by Gibson et al. in U.S. Pat. No. 7,930,087. Therein, exhaust cam lift and/or phase and/or intake valve timing is adjusted, such as by holding the intake valves closed while the exhaust valves are operated to generate a pumping loss torque or by holding both the intake and exhaust valves closed to reduce the pumping loss torque. Further, manifold air pressure may be lowered, such as via throttle control.

However, the inventors herein have recognized potential issues with such systems. As one example, the valve control may be expensive, for example, due to control flexibility and/or due to valve-piston clearance. Further, deactivating both the intake valve and the exhaust valve may not eliminate torque pulsations. Further still, the inventors herein have recognized that a split exhaust system provides an opportunity for reducing engine compression torque. For example, the split exhaust system may include a first exhaust manifold that routes exhaust to a turbine of a turbocharger and to a downstream catalyst and a second exhaust manifold that routes exhaust gas recirculation (EGR) to an intake of the engine, upstream of a compressor of the turbocharger, to decrease engine knock and increase engine efficiency. In such an engine system, each cylinder may include two intake valves and two exhaust valves, where a first set of cylinder exhaust valves (e.g., blowdown exhaust valves) are exclusively coupled to the first exhaust manifold, and a second set of cylinder exhaust valves (e.g., scavenge exhaust valves) are exclusively coupled to the second exhaust manifold. The first set of cylinder exhaust valves may be operated at a different timing than the second set of cylinder exhaust valves, thereby isolating a blowdown portion and a scavenging portion of exhaust gases. The timing of the second set of cylinder exhaust valves may also be coordinated with a timing of the cylinder intake valves to create a positive valve overlap period where fresh intake air (or a mixture of fresh intake air and EGR), referred to as blowthrough, may flow through the cylinders and back to the intake, upstream of the compressor, via an EGR passage coupled to the second exhaust manifold. Due to the valve configuration of the split exhaust system engine enabling blowthrough, for example, the split exhaust system engine already has the valve-piston clearance to maintain the second set of cylinder exhaust valves open when the piston is at top dead center.

In one example, the issues described above may be addressed by a method comprising: while rotating an engine unfueled at a non-zero speed, maintaining closed a first exhaust valve of a cylinder, the first exhaust valve coupled to a blowdown exhaust manifold coupled to an exhaust passage, and increasing an open duration of a second exhaust valve of the cylinder, the second exhaust valve coupled to a scavenge manifold coupled to an intake passage. In this way, engine compression torque may be reduced. In effect, the engine always has at least one of its valves (intake or either exhaust valve) open, thus preventing compression.

As one example, increasing the open duration of the second exhaust valve includes maintaining open the second exhaust valve while intake valves of the cylinder are closed. As another example, increasing the open duration of the second exhaust valve includes maintaining open the second exhaust valve throughout an entire engine cycle. As still another example, increasing the open duration of the second exhaust valve includes opening the second exhaust valve during at least a compression stroke and an exhaust stroke of the cylinder. The different valve control strategies of the second exhaust valve reduce a pressure increase within the cylinder, thereby reducing an amount of compression and expansion torque produced and enabling the engine to be rotated unfired even at low (e.g., sub-idle) speeds during various vehicle operating modes, including regenerative braking, electric creep, and light launch. By enabling regenerative braking, electric creep, and light launch while spinning the engine unfired at low engine speeds, fuel economy is increased. Further, by maintaining the first exhaust valve closed, airflow to the catalyst may be prevented. As a result, using additional fuel for catalyst regeneration following the engine-off event is avoided, thereby further increasing fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
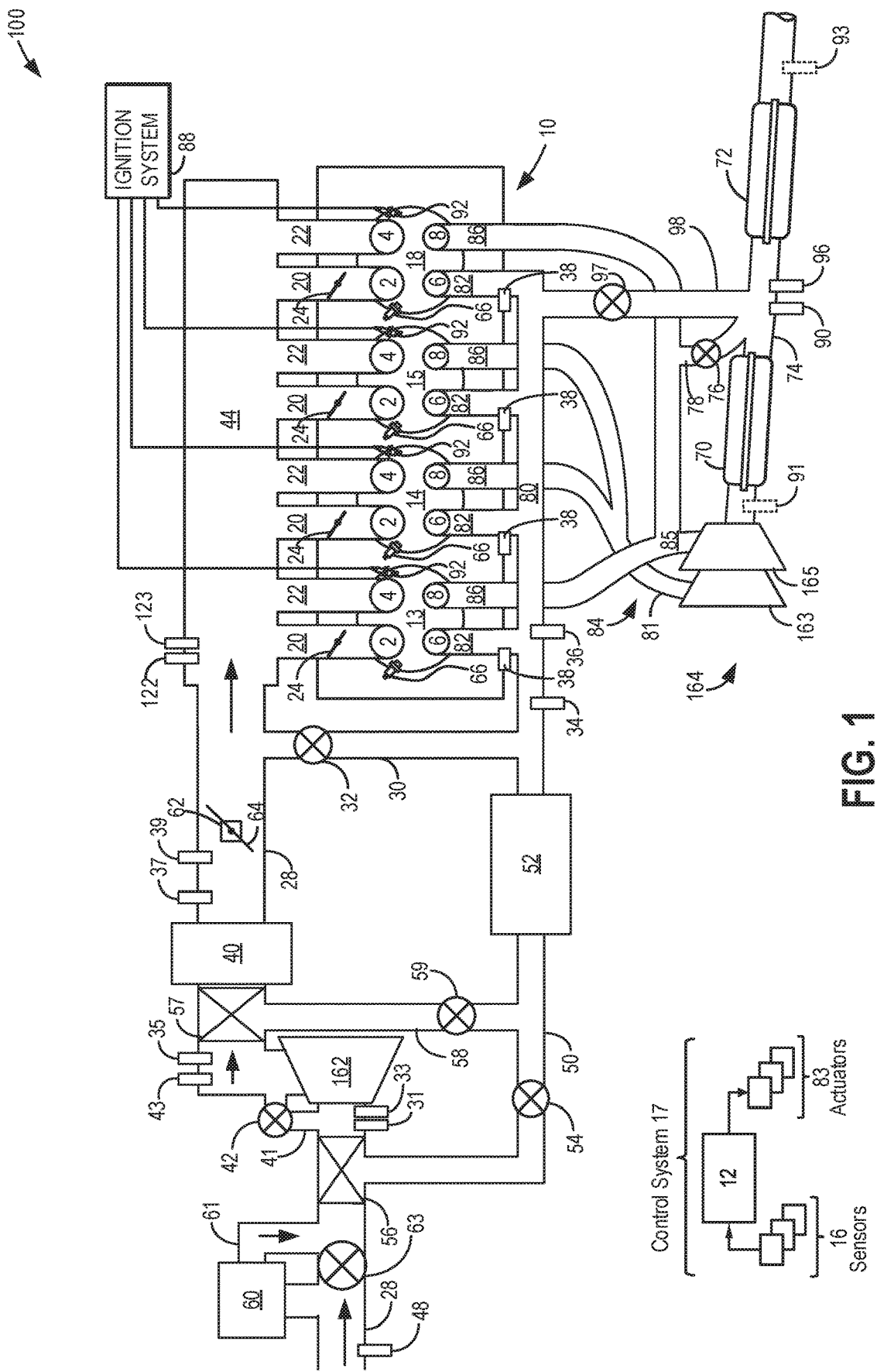
FIG. 1 shows a schematic depiction of a turbocharged engine system with a split exhaust system.
Figure 2:
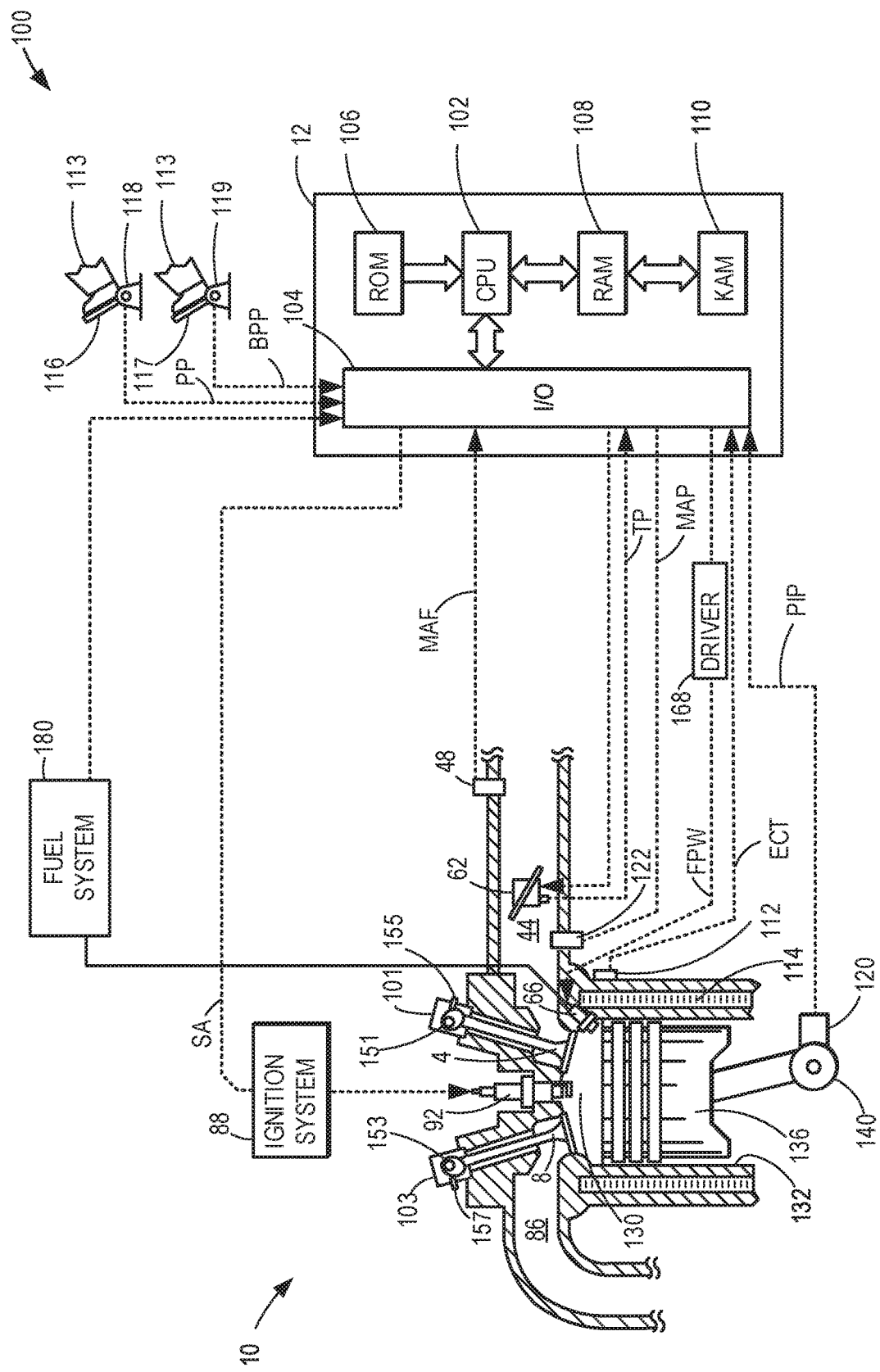
FIG. 2 shows an embodiment of a cylinder of the engine system of FIG. 1.

The following description relates to systems and methods for reducing compression torque in an engine having a split exhaust system, such as the engine system shown in FIGS. 1-2. Further, the engine system may be included in a hybrid powertrain, such as the example powertrain shown in FIG. 3. For example, the hybrid powertrain may include an architecture where the engine is rotationally coupled to an electric machine without a disconnect clutch coupled therebetween. To reduce the compression torque while spinning the engine unfueled, a controller may adjust cylinder intake and exhaust valve timings according to the example method shown in FIG. 5. For example, the cylinder intake and exhaust valve timings may be adjusted from the example nominal valve timing shown in FIG. 4, which may be used during combustion to facilitate exhaust gas recirculation and blowthrough, to one of the example adjusted timings shown in FIGS. 6 and 7. An example timeline of operating the vehicle during various in-gear, engine-off modes, including deceleration fuel shut-off, regenerative braking, electric creep, and light launch, is shown in FIG. 8.

Turning now to the figures, FIG. 1 shows a schematic diagram of a multi-cylinder internal combustion engine 10, which may be included in a propulsion system of a vehicle 100. Engine 10 includes a plurality of combustion chambers (e.g., cylinders), which may be capped on the top by a cylinder head (not shown). In the example shown in FIG. 1, engine 10 includes cylinders 13, 14, 15, and 18, arranged in an inline-4 configuration. It should be understood, however, that although FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as will be further described below. Each of cylinders 13, 14, 15, and 18 include two intake valves, including first intake valve 2 and second intake valve 4, and two exhaust valves, including first exhaust valve (referred to herein as a blowdown exhaust valve, or blowdown valve) 8 and second exhaust valve (referred to herein as a scavenge exhaust valve, or scavenge valve) 6. The intake valves and exhaust valves may be referred to herein as cylinder intake valves and cylinder exhaust valves, respectively. As explained below with reference to FIG. 2, a timing (e.g., opening timing, closing timing, opening duration, etc.) of each of the intake valves may be controlled via various camshaft timing systems. In one example, both of the first intake valves 2 and second intake valves 4 may be controlled to a same valve timing (e.g., such that they open and close at the same time in the engine cycle). In an alternative example, the first intake valves 2 and second intake valves 4 may be controlled at a different valve timing. Further, the first exhaust valves 8 may be controlled at a different valve timing than the second exhaust valves 6, such that the first exhaust valve and the second exhaust valve of a same cylinder open and close at different times than one another and, as further discussed below.

Each cylinder receives intake air (or a mixture of intake air and recirculated exhaust gas, as will be elaborated below) from an intake manifold 44 via an air intake passage 28. Intake manifold 44 is coupled to the cylinders via intake ports (e.g., runners). For example, intake manifold 44 is shown in FIG. 1 coupled to each first intake valve 2 of each cylinder via a first intake port 20. Further, the intake manifold 44 is coupled to each second intake valve 4 of each cylinder via a second intake port 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

One or more of the intake ports may include a charge motion control device, such as a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other configurations of the valve are possible. Note that for the purposes of this disclosure, the CMCV 24 is in the "closed" (e.g., fully closed) position when it is fully activated and the valve plate is fully tilted into the respective first intake port 20, thereby resulting in maximum air charge flow obstruction. Alternatively, the CMCV 24 is in the "open" (e.g., fully open) position when deactivated and the valve plate is fully rotated to lie substantially parallel with airflow, thereby considerably minimizing or eliminating airflow charge obstruction. The CMCVs may be principally maintained in their "open" position and may only be activated "closed" when swirl conditions are desired. As shown in FIG. 1, only one intake port of each cylinder includes CMCV 24. However, in other examples, both intake ports of each cylinder may include a CMCV 24. A controller 12 may actuate CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active. As referred to herein, blowthrough air or blowthrough combustion cooling (BTCC) may refer to intake air that flows from the one or more intake valves of each cylinder to second exhaust valves 6 during a valve opening overlap period between the intake valves and second exhaust valves 6 (e.g., a period when both the intake valves and second exhaust valves 6 are open at the same time), without combusting the blowthrough air.

A high pressure, dual stage fuel system (such as the fuel system shown in FIG. 2) may be used to generate fuel pressures at a fuel injector 66 coupled to each cylinder. As such, fuel may be directly injected into the cylinders via fuel injectors 66. A distributorless ignition system 88 provides an ignition spark to cylinders 13, 14, 15, and 18 via sparks plug 92 in response to a signal from controller 12 to initiate combustion. Cylinders 13, 14, 15, and 18 are each coupled to two exhaust ports for channeling blowdown and scavenging portions of the combustion gases separately. Specifically, as shown in FIG. 1, cylinders 13, 14, 15, and 18 exhaust a first, blowdown portion of the combustion gases to a first exhaust manifold (also referred to herein as a blowdown manifold) 84 via first exhaust runners (e.g., ports) 86 and a second, scavenging portion of the combustion gases to a second exhaust manifold (also referred to herein as a scavenge manifold) 80 via second exhaust runners (e.g., ports) 82. Additionally, first exhaust manifold 84 includes a first manifold portion 81 and second manifold portion 85. First exhaust runners 86 of cylinders 13 and 18 (referred to herein as the outside cylinders) extend from cylinders 13 and 18 to the second manifold portion 85 of first exhaust manifold 84, whereas first exhaust runners 86 of cylinders 14 and 15 (referred to herein as the inside cylinders) extend from cylinders 14 and 15 to the first manifold portion 81 of first exhaust manifold 84. Second exhaust runners 82 extend from cylinders 13, 14, 15, and 18 to second exhaust manifold 80.

Each exhaust runner can selectively communicate with the cylinder it is coupled to via the corresponding exhaust valve. For example, second exhaust runners 82 communicate with their respective cylinders via second exhaust valves 6, and first exhaust runners 86 communicate with their respective cylinders via first exhaust valves 8. Second exhaust runners 82 are isolated from first exhaust runners 86 when at least one exhaust valve of each cylinder is in a closed position. Exhaust gases may not flow directly between second exhaust runners 82 and first exhaust runners. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another, and thus the first and second portions of exhaust gases do not mix with one another within the first and second exhaust manifolds).

Engine 10 is shown having a turbocharger, including a dual-stage exhaust turbine 164 and an intake compressor 162 coupled on a common shaft (not shown). Dual-stage turbine 164 includes a first turbine 163 and second turbine 165. First turbine 163 is directly coupled to first manifold portion 81 of first exhaust manifold 84 and receives exhaust gases only from cylinders 14 and 15 via first exhaust valves 8 of cylinders 14 and 15. Second turbine 165 is directly coupled to second manifold portion 85 of first exhaust manifold 84 and receives exhaust gases only from cylinders 13 and 18 via first exhaust valves 8 of cylinders 13 and 18. Rotation of the first and second turbines drives rotation of compressor 162, disposed within the intake passage 28. As such, the intake air becomes boosted (e.g., pressurized) at the compressor 162 and travels downstream to intake manifold 44. Exhaust gases exit both first turbine 163 and second turbine 165 into a common exhaust passage 74. In other examples, instead of a dual-stage turbine, turbine 164 may comprise a single turbine wheel fed by two turbine scrolls or passages that introduce gas to different portions of the turbine wheel. For instance, the two scrolls may each introduce gas around the entire perimeter of the wheel, but at different axial locations (commonly known as a twin scroll turbine). Alternatively, the two scrolls may each introduce gas to the turbine over a portion of the perimeter, such as approximately 180 degrees. In another example, engine 10 may include a single stage turbine where all exhaust gases from the first exhaust manifold 84 are directed to an inlet of a same turbine.

A wastegate, also referred to as a blowdown wastegate, may be coupled to first exhaust manifold 84 in one of the first exhaust runners. As shown in FIG. 1, a blowdown wastegate valve 76 (hereafter, BDWG 76) may be included in a bypass 78 that couples first exhaust runner 86 of cylinder 18 (e.g., at a first end) to exhaust passage 74 (e.g., at a second end). The second end of bypass 78 may merge with a flow passage 98 of second exhaust manifold 80 at a region along exhaust passage 74 in between a first emission control device 70 and a second emission control device 72, as shown in FIG. 1, or, alternatively, between turbine 164 and first emission control device 70. When BDWG 76 is in a closed position, exhaust gas flowing into first exhaust manifold 84 is directed to turbine 164 (and is prevented from flowing through bypass 78). However, when BDWG 76 is opened, including in a fully open position and any position between fully open and closed, a portion of the exhaust gas flowing into first exhaust manifold 84 may be channeled through bypass 78 to exhaust passage 74, thus decreasing an amount of exhaust gas delivered to dual-stage turbine 164. Specifically, when BDWG 76 is open, or at least partially open, at least some of the exhaust gas from first exhaust runner 86 of cylinder 18 is channeled through bypass 78, away from the dual-stage turbine 164, and to the exhaust passage 74, downstream of the first emission control device 70 and upstream of the second emission control device 72. Additionally, a portion of exhaust gas from cylinder 13 flowing into the second manifold portion 85 may flow toward exhaust runner 87 and into bypass 78 through the at least partially open BDWG 76. In this way, a position of BDWG 76 may be adjusted to control an amount of boost provided by the turbocharger. For example, by increasing the amount of opening of the BDWG 76 (e.g., from closed to open or partially open), the speed of the second turbine 165 (and thus the compressor 162) is decreased, thereby decreasing boost. It will be appreciated that the configuration of engine 10 shown in FIG. 1 is a non-limiting example of the engine, and other examples may include the BDWG 76 coupled to another exhaust runner of the first exhaust runners 86.

Exhaust gases exiting dual-stage turbine 164 flow downstream in exhaust passage 74 to first emission control device 70 and second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way catalysts. In other examples, emission control devices 70 and 72 may include one or a plurality of a diesel oxidation catalyst (DOC) and a selective catalytic reduction catalyst (SCR). In yet another example, second emission control device 72 may include a gasoline particulate filter (GPF). In one example, first emission control device 70 may include a catalyst, and second emission control device 72 may include a GPF. After passing through emission control devices 70 and 72, exhaust gases may be directed out to a tailpipe.

Exhaust passage 74 further includes a plurality of exhaust sensors in electronic communication with controller 12, which is included in a control system 17, as will be further described below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned between dual-stage turbine 164 and first emission control device 70 and/or third oxygen sensor 93 positioned downstream of second emission control device 72. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one example, one or more of oxygen sensor 90, oxygen sensor 91, and oxygen sensor 93 may be universal exhaust gas oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1, a pressure sensor 96 is positioned within exhaust passage 74 between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where flow passage 98 and bypass 78 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as a scavenge manifold bypass valve, SMBV) is disposed within scavenge manifold bypass passage 98 and may be actuated by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor (e.g., turbocharger compressor) 162 (and thus may be referred to as a low-pressure EGR passage). As such, exhaust gases (or blowthrough air, as explained further below) is directed from second exhaust manifold 80 to air intake passage 28, upstream of compressor 162, via first EGR passage 50. As shown in FIG. 1, first EGR passage 50 may include an EGR cooler 52 configured to cool exhaust gases flowing from second exhaust manifold 80 to intake passage 28 and may further include a first EGR valve 54 (which may be referred to herein as a BTCC valve) disposed therein. Controller 12 is configured to actuate and adjust a position of BTCC valve 54 in order to control a flow rate and/or amount through first EGR passage 50. When the BTCC valve 54 is in a closed (e.g., fully closed) position, no exhaust gases or intake air may flow from second exhaust manifold 80 to intake passage 28, upstream of compressor 162. Further, when the BTCC valve 54 is in an open position, exhaust gases and/or blowthrough air may flow from second exhaust manifold 80 to intake passage 28, upstream of compressor 162. Controller 12 may additionally adjust the BTCC valve 54 into a plurality of positions between fully open and fully closed. In other examples, controller 12 may only adjust BTCC valve 54 to be either fully open or fully closed.

A first ejector 56 is positioned at an outlet of EGR passage 50, within intake passage 28. First ejector 56 may include a constriction or venturi that provides a pressure increase at the inlet of the compressor 162. As a result, EGR from the EGR passage 50 may be mixed with fresh air flowing through the intake passage 28 to the compressor 162. Thus, EGR from the EGR passage 50 may act as the motive flow on the first ejector 56. In an alternative example, there may not be an ejector positioned at the outlet of EGR passage 50. Instead, an outlet of compressor 162 may be shaped as an ejector that lowers the gas pressure to assist in EGR flow (and thus, in this example, air is the motive flow and EGR is the secondary flow). In yet another example, EGR from EGR passage 50 may be introduced at a trailing edge of a blade of compressor 162, thereby allowing blowthrough air to be delivered to intake passage 28 via EGR passage 50.

A second EGR passage 58 is coupled between first EGR passage 50 and intake passage 28. Specifically, as shown in FIG. 1, second EGR passage 58 is coupled to first EGR passage 50 between BTCC valve 54 and EGR cooler 52. In other examples, when second EGR passage 58 is included in the engine system, the system may not include EGR cooler 52. Additionally, second EGR passage 58 is directly coupled to intake passage 28, downstream of compressor 162. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and recirculated exhaust gases) as it passes through CAC 40. As such, recirculated exhaust gases from first EGR passage 50 and/or second EGR passage 58 may be cooled via CAC 40 before entering intake manifold 44. In an alternative example, second EGR passage 58 may be coupled to intake passage 28 downstream of CAC 40. In such an example, there may be no EGR cooler 52 disposed within first EGR passage 50. Further, as shown in FIG. 1, a second ejector 57 may be positioned within intake passage 28 at an outlet of second EGR passage 58.

A second (e.g., mid-pressure) EGR valve 59 is disposed within second EGR passage 58. Second EGR valve 59 is configured to adjust an amount of gas flow (e.g., intake air or exhaust) through second EGR passage 58. As further described below, controller 12 may actuate EGR valve 59 into an open (e.g., fully open) position (allowing minimally restricted flow thorough second EGR passage 58), a closed (e.g., fully closed) position (blocking flow through second EGR passage 58), or plurality of positions between fully open and fully closed based on (e.g., as a function of) engine operating conditions. For example, actuating the EGR valve 59 may include the controller 12 sending an electronic signal to an actuator of the EGR valve 59 to move a valve plate of EGR valve 59 into the open position, the closed position, or some position between fully open and fully closed. Based on system pressures and positions of various other valves in the engine system, air may either flow toward intake passage 28 within second EGR passage 58 or toward second exhaust manifold 80 within second EGR passage 58.

Intake passage 28 further includes an intake throttle 62. As shown in FIG. 1, intake throttle 62 is positioned downstream of CAC 40. A position of a throttle plate 64 of throttle 62 can be adjusted by control system 17 via a throttle actuator (not shown) communicatively coupled to controller 12. By modulating intake throttle 62 while operating compressor 162, an amount of fresh air may be inducted from the atmosphere and/or an amount of recirculated exhaust gas from the one or more EGR passages into engine 10, cooled by CAC 40 and delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from the compressor outlet, upstream of CAC 40, to the compressor inlet. A compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80, and a second end of third flow passage 30 is directly coupled to intake passage 28, downstream of intake throttle 62 and upstream of intake manifold 44. A third valve 32 (e.g., a hot pipe valve) is disposed within third flow passage 30 and is configured to adjust an amount of air flow through third flow passage 30. Third valve 32 may be actuated into a fully open position, fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air, exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38 and/or oxygen sensor 36.

In some examples, as shown in FIG. 1, intake passage 28 may include an electric compressor 60. Electric compressor 60 is disposed in a bypass passage 61, which is coupled to intake passage 28 upstream and downstream of an electric compressor valve 63. Specifically, an inlet to bypass passage 61 is coupled to intake passage 28 upstream of electric compressor valve 63, and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of electric compressor valve 63 in intake passage 28. An intake pressure sensor 31 and an intake temperature sensor 33 are positioned in intake passage 28 upstream of compressor 162 and downstream of where first EGR passage 50 couples to intake passage 28. An intake oxygen sensor 35 and an intake temperature sensor 43 may be located in intake passage 28 downstream of compressor 162 and upstream of CAC 40. An additional intake pressure sensor 37 may be positioned in intake passage 28 downstream of CAC 40 and upstream of throttle 28. In some examples, as shown in FIG. 1, an additional intake oxygen sensor 39 may be positioned in intake passage 28 between CAC 40 and throttle 62. Further, an intake manifold pressure (e.g., MAP) sensor 122 and an intake manifold temperature sensor 123 are positioned within intake manifold 44, upstream of all engine cylinders.

Figure 3:
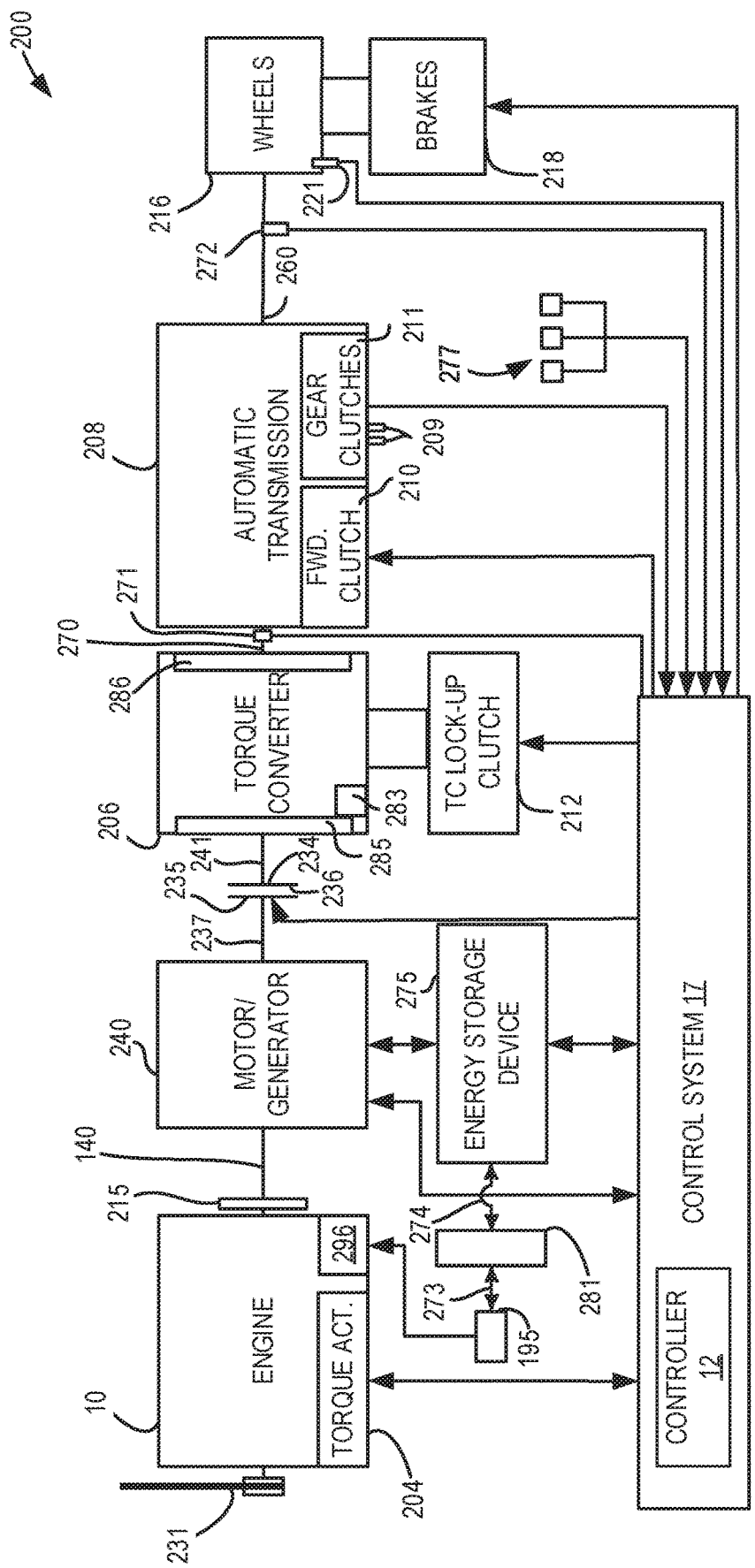
FIG. 3 is a schematic diagram of a vehicle driveline.

In some examples, engine 10 may be coupled to an electric motor/battery system (as shown in FIG. 3) in a hybrid vehicle. The hybrid vehicle may have a parallel configuration, series configuration, or variation or combinations thereof. Further, in some examples, other engine configurations may be employed, for example a diesel engine.

Engine 10 may be controlled at least partially by control system 17, including controller 12, and by input from a vehicle operator via an input device (not shown in FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and second exhaust manifold 80 described above. Other sensors may include a throttle inlet temperature sensor for estimating a throttle air temperature (TCT) coupled downstream of throttle 62 in the intake passage. Additional system sensors and actuators are elaborated below with reference to FIG. 2. As another example, actuators 83 may include fuel injectors 66, valves 63, 42, 54, 59, 32, 97, 76, and throttle 62. Actuators 83 may further include various camshaft timing actuators coupled to the cylinder intake and exhaust valves (as described below with reference to FIG. 2). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 5. For example, operation of first exhaust valve 8, second exhaust valve 6, and optionally intake valves 2 and 4 may be adjusted to reduce compression torque when the engine is spun unfired.

It should be noted that while FIG. 1 shows engine 10 including each of first EGR passage 50, second EGR passage 58, flow passage 98, and flow passage 30, in other examples, engine 10 may only include a portion of these passages. For example, engine 10 may only include first EGR passage 50 and flow passage 98 and not include second EGR passage 58 and flow passage 30. In another example, engine 10 may include first EGR passage 50, second EGR passage 58, and flow passage 98, but not include flow passage 30. In yet another example, engine 10 may include first EGR passage 50, flow passage 30, and flow passage 98, but not second EGR passage 58. In some examples, engine 10 may not include electric compressor 60. In still other examples, engine 10 may include all or only a portion of the sensors shown in FIG. 1.

Referring now to FIG. 2, it depicts a partial view of a single cylinder of internal combustion engine 10, which may be installed in vehicle 100. As such, components previously introduced in FIG. 1 are represented with the same reference numbers and are not re-introduced. Engine 10 is depicted with combustion chamber (cylinder) 130, which may represent any of cylinders 13, 14, 15, and 18 of FIG. 1. Combustion chamber 130 includes a coolant sleeve 114 and cylinder walls 132, with a piston 136 positioned therein and connected to a crankshaft 140. As used herein, the phrases "rotating the engine" and "spinning the engine" refer to crankshaft 140 rotating about its central axis. Combustion chamber 130 is shown communicating with intake manifold 44 and first exhaust runner 86 via intake valve 4 and first exhaust valve 8, respectively. As previously described in FIG. 1, each cylinder of engine 10 may exhaust combustion products along two conduits, and only the first exhaust runner (e.g., port) leading from the cylinder to the turbine is shown in FIG. 2, while the second exhaust runner (e.g., second exhaust runner 82) is not visible in this view.

As also previously elaborated in FIG. 1, each cylinder of engine 10 may include two intake valves and two exhaust valves. In the depicted view, only one intake valve (e.g., intake valve 4) and first exhaust valve 8 are shown. Intake valve 4 and first exhaust valve 8 are located at an upper region of combustion chamber 130. Intake valve 4 and first exhaust valve 8 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve, including intake valve 4, is controlled by an intake cam 151, and each exhaust valve, including first exhaust valve 8, is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the first exhaust valve 8 such that it remains closed and does not open at its set timing. The position of intake camshaft 151 and exhaust camshaft 153 may be determined by camshaft position sensors 155 and 157, respectively. As introduced above, in one example, all exhaust valves of every cylinder may be controlled on a same exhaust camshaft. As such, a timing of both of the scavenge (second) exhaust valve and the blowdown (first) exhaust valve may be adjusted together via one camshaft, but they may each have different timings relative to one another. In another example, the scavenge exhaust valve of every cylinder may be controlled via a first exhaust camshaft, and a blowdown exhaust valve of every cylinder may be controlled on via different, second exhaust camshaft. In this way, the valve timing of the scavenge valves and blowdown valves may be adjusted separately from one another. In alternate examples, the cam or valve timing system(s) of the scavenge and/or blowdown exhaust valves may employ a cam in cam system, an electrohydraulic-type system on the scavenge valves, and/or an electro-mechanical valve lift control on the scavenge valves.

In some examples, the intake and/or exhaust valves may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at lower cylinder pressures from exhaust gases exhausted at higher cylinder pressures. For example, a first exhaust cam profile can open the first exhaust valve (e.g., blowdown valve) from a closed position just before bottom dead center (BDC) of the power stroke of combustion chamber 130 and close the same exhaust valve well before top dead center (TDC) of the exhaust stroke to selectively exhaust blowdown gases from the combustion chamber. Further, a second exhaust cam profile can be used to open the second exhaust valve (e.g., scavenge valve) from a closed position before a mid-point of the exhaust stroke and close it after TDC to selectively exhaust the scavenging portion of the exhaust gases.

Thus, the timing of the first exhaust valve and the second exhaust valve can isolate cylinder blowdown gases from a scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency may be increased.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. Ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse width of a signal FPW received from controller 12 via an electronic driver 168. In this manner, fuel injector 66 provides what is known as direct injection (hereafter also referred to as "DI") of fuel into cylinder 130. While FIG. 2 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including a measurement of inducted mass air flow (MAF) from mass air flow sensor 48; an engine coolant temperature signal (ECT) from a temperature sensor 112 coupled to coolant sleeve 114; a profile ignition pickup signal (PIP) from a Hall effect sensor 120 (or other type) coupled to crankshaft 140; a throttle position (TP) from a throttle position sensor; and an absolute manifold pressure signal (MAP) from sensor 122. Engine speed signal, RPM, may be generated by controller 12 from signal PIP. Manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

Further, vehicle 100 may be a hybrid vehicle with multiple sources of torque available to one or more vehicle wheels (e.g., drive wheels). Continuing to FIG. 3, a block diagram is shown of a powertrain or driveline 200, which may be included in vehicle 100 of FIGS. 1 and 2. Thus, similar components previously described with respect to FIGS. 1 and 2 are numbered the same and may not be reintroduced. For example, the powertrain of FIG. 3 includes engine 10 shown in FIGS. 1 and 2. Further, control system 17 may include one or more controllers, including one or more of a vehicle system controller, an engine controller, an electric machine controller, a transmission controller, an energy storage device controller, and a brake controller, which may communicate over a controller area network. Each of the controllers may provide information to other controllers, such as sensor data, actuator data, and diagnostic information. In some examples, the controllers may be configured in a hierarchy such that one controller is a primary controller that issues commands to one or more secondary controllers. As an example, the vehicle system controller may provide commands to the engine controller to achieve driver input requests and other requests that are based on vehicle operating conditions. In other examples, one or more of the various controllers described above may be integrated in a single controller, such as controller 12, as shown. Thus, controller 12 may serve as the vehicle system controller, the engine controller, the electric machine controller, the transmission controller, the energy storage device controller, and the brake controller. As another example, controller 12 may include the vehicle system controller and the engine controller as a single unit while the electric machine controller, the transmission controller, and the brake controller are standalone controllers. However, the partitioning of the controllers of control system 17 may be different than the examples specifically listed.

Powertrain 200 may be powered by engine 10 and an electric machine 240, which may be a driveline integrated starter/generator (ISG) coupled directly to crankshaft 140 of engine 10, as shown in FIG. 3 (e.g., a P1 mild hybrid architecture). However, in other examples, electric machine 240 instead may be mechanically coupled to engine 10 via an accessory belt 231, and electric machine may be a belt integrated starter/generator (BISG) (e.g., in a P0 mild hybrid architecture). Notably, in both the P0 and the P1 mild hybrid architecture, engine 10 and electric machine 240 cannot be mechanically disconnected. Therefore, when engine 10 is operated at a non-zero speed, electric machine 240 is also operated at a non-zero speed, and vice versa. Although the systems and methods herein are described with respect to P1 and P0 mild hybrid architectures, other architectures are also possible (e.g., P2, P3, and P4), such as where the electric machine can be mechanically decoupled from the engine (e.g., via a clutch).

Engine 10 may be started via a starter motor 296 or via electric machine 240. Electric machine 240 may be a high voltage (e.g., operated with greater than 30 V) electric machine and may be motor and/or generator (e.g., a motor/generator). For example, electric machine 240 may operate as a motor when supplied with electrical power via an energy storage device 275. As another example, electric machine 240 may operate as a generator when supplying electrical power to electric energy storage device 275. Electrical energy storage device 275 may be a battery, a capacitor, or an inductor. A bi-directional DC/DC converter 281 may transfer electrical energy from a high voltage bus 274 to a low voltage bus 273 or vice versa. A low voltage battery 195 is electrically coupled to low voltage bus 273. Energy storage device 275 is electrically coupled to high voltage bus 274. Low voltage battery 195 may selectively supply electrical energy to starter motor 296, for example, which may be a low voltage electric machine (e.g., operated with 12 V).

An engine output torque may be transmitted to an input or first side 235 of powertrain disconnect clutch 236 through dual mass flywheel 215 and electric machine 240. Disconnect clutch 236 may be electrically or hydraulically actuated. The first side 235 of disconnect clutch 236 is shown mechanically coupled to an output shaft 237 of electric machine 240, and a second, downstream side 234 of disconnect clutch 236 is shown mechanically coupled to a torque converter 206 via a shaft 241. Further, torque of engine 10 may be adjusted via a torque actuator 204, which may be a fuel injector, throttle, etc.

Electric machine 240 may be operated to provide torque to powertrain 200 or to convert powertrain torque into electrical energy to be stored in energy storage device 275 in a regeneration mode. Electric machine 240 is in electrical communication with energy storage device 275. Electric machine 240 has a higher output torque capacity than starter motor 296. Further, in the configuration shown in FIG. 3, electric machine 240 directly drives powertrain 200 or is directly driven by powertrain 200, without belts, gears, or chains to couple electric machine 240 to powertrain 200. Rather, electric machine 240 rotates at the same rate as powertrain 200. Electric machine 240 may provide a positive torque or a negative torque to powertrain 200 via operating as a motor or generator as instructed by control system 17.

Torque converter 206 includes a turbine 286 configured to output torque to input shaft 270. Input shaft 270 mechanically couples torque converter 206 to automatic transmission 208. Torque converter 206 also includes a torque converter bypass lock-up clutch (TCC) 212. Torque is directly transferred from an impeller 285 to turbine 286 when TCC 212 is locked. TCC 212 is electrically operated by control system 17. Alternatively, TCC 212 may be hydraulically locked. In one example, torque converter 206 may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to input shaft 270 of transmission 208. Alternatively, the torque converter lock-up clutch 212 may be partially engaged, thereby enabling the amount of torque directly relayed to transmission 208 to be adjusted. Controller 12 may be configured to adjust the amount of torque transmitted by torque converter 206 by adjusting torque converter lock-up clutch 212 in response to various engine operating conditions and/or a driver-based request.

Automatic transmission 208 includes gear clutches (e.g., gears 1-10) 211 and a forward clutch 210. Automatic transmission 208 may be a fixed ratio transmission, for example. The gear clutches 211 and the forward clutch 210 may be selectively engaged to change a ratio of an actual total number of turns of input shaft 270 to an actual total number of turns of vehicle wheels 216. Gear clutches 211 may be engaged or disengaged via adjusting fluid supplied to the clutches via shift control solenoid valves 209. Torque output from the automatic transmission 208 may be relayed to vehicle wheels 216 to propel the vehicle via an output shaft 260. Specifically, automatic transmission 208 may transfer an input driving torque at the input shaft 270 responsive to a vehicle traveling condition before transmitting an output driving torque to the vehicle wheels 216. Controller 12 (or a separate transmission controller of control system 17) selectively activates or engages TCC 212, gear clutches 211, and forward clutch 210. Controller 12 also selectively deactivates or disengages TCC 212, gear clutches 211, and forward clutch 210.

Torque converter 206 also includes a pump 283 that pressurizes fluid to operate disconnect clutch 236, forward clutch 210, and gear clutches 211. Pump 283 is driven via impeller 285, which rotates at a same speed as electric machine 240 when disconnect clutch 236 is engaged.

Further, a frictional force may be applied to vehicle wheels 216 by engaging friction wheel brakes 218. In one example, friction wheel brakes 218 may be engaged in response to the driver depressing a brake pedal (e.g., brake pedal 117 of FIG. 2) and/or in response to instructions within controller 12 or a separate brake controller of control system 17. In the same way, a frictional force applied to vehicle wheels 216 may be reduced by disengaging wheel brakes 218 in response to the driver releasing the brake pedal and/or in response to instructions and/or information received by control system 17.

In response to a request to accelerate the vehicle, controller 12 may obtain a driver demanded torque or power request from an accelerator pedal (e.g., accelerator pedal 116 shown in FIG. 2) or other device. Controller 12 (or a separate vehicle system controller of control system 17) may then allocate a fraction of the requested driver demanded torque to engine 10 and the remaining fraction to electric machine 240. If a total torque produced by both engine 10 and electric machine 240 is less than an upper transmission input torque threshold (e.g., a torque value that may not be exceeded), the torque is delivered to torque converter 206, which then relays at least a fraction of the requested torque to transmission input shaft 270. Controller 12 selectively locks TCC 212 and engages gears via gear clutches 211 in response to shift schedules and TCC lockup schedules that may be based on input shaft torque and vehicle speed. In some conditions, such as when it is desired to charge energy storage device 275, a charging torque (e.g., a negative electric machine torque) may be requested while a non-zero driver demanded torque is present. Controller 12 may request increased engine torque to overcome the charging torque to meet the driver demand torque.

In response to a request to decelerate the vehicle and provide regenerative braking, controller 12 may provide a negative desired wheel torque based on vehicle speed and brake pedal position. Controller 12 may then allocate a fraction of the negative desired wheel torque to electric machine 240 (e.g., a desired powertrain wheel torque) and the remaining fraction to friction brakes 218 (e.g., a desired friction brake wheel torque). Further, controller 12 may shift gears 211 based on a unique shifting schedule to increase regeneration efficiency. Electric machine 240 supplies a negative torque to transmission input shaft 270, but negative torque provided by electric machine 240 may be limited by a lower transmission input shaft torque threshold (e.g., a negative torque input value that may not be exceeded). Further, the negative torque of electric machine 240 may be limited (e.g., constrained to less than a threshold negative torque) based on operating conditions of electric energy storage device 275, for example. Any portion of desired negative wheel torque that may not be provided by electric machine 240 because of transmission or electric machine limits may be allocated to friction brakes 218 so that the desired wheel torque is provided by a combination of negative wheel torque from friction brakes 218 and electric machine 240.

Further, as one example, an engine torque output may be controlled by adjusting a combination of spark timing, fuel pulse width, fuel pulse timing, and/or air charge (e.g., by controlling throttle opening and/or valve timing, valve lift and boost amount). In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 (or a separate electric machine controller of control system 17) may control torque output and electrical energy production from electric machine 240 by adjusting current flowing to and from field and/or armature windings of electric machine 240, for example.

Controller 12 receives a transmission input shaft position via a position sensor 271. Controller 12 may convert the transmission input shaft position into input shaft speed via differentiating a signal from position sensor 271 or counting a number of known angular distance pulses over a predetermined time interval. Controller 12 may receive a transmission output shaft torque from a torque sensor 272. Alternatively, torque sensor 272 may be a position sensor or a combination of torque and position sensors. If torque sensor 272 is a position sensor, Controller 12 may count shaft position pulses over a predetermined time interval to determine transmission output shaft velocity. Controller 12 may also differentiate transmission output shaft velocity to determine transmission output shaft acceleration. Controller 12 may also receive additional transmission information from sensors 277, which may include, but are not limited to pump output line pressure sensors, transmission hydraulic pressure sensors (e.g., gear clutch fluid pressure sensors), electric machine temperature sensors, and ambient temperature sensors. Further, controller 12 receives wheel speed information via a wheel speed sensor 221.

Thus, the systems of FIGS. 1-3 provide a system for a hybrid vehicle, including an engine rotationally coupled to an electric machine, the engine including a split exhaust system that directs a first portion of exhaust toward a catalyst (e.g., via a blowdown exhaust valve) and a second portion of exhaust and/or blowthrough toward an EGR system (e.g., via a scavenge exhaust valve). In particular, the hybrid vehicle may be configured such that the engine is not decouplable from the electric machine, causing the engine to rotate at the same speed as the electric machine even when the engine is unfired (e.g., unfueled, without combustion occurring within the engine cylinders).

Figure 4:
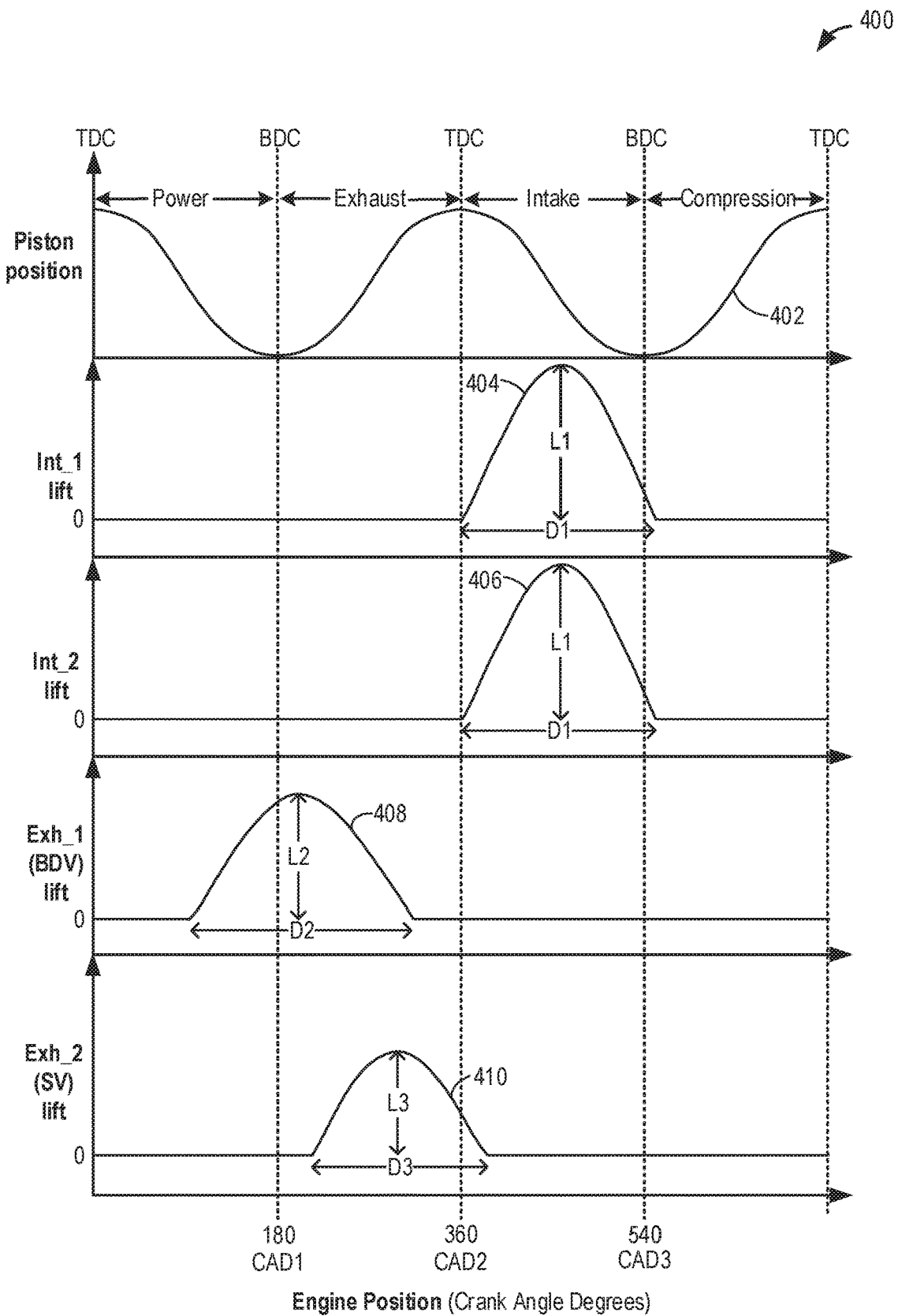
FIG. 4 shows exemplary cylinder intake valve and exhaust valve timings for one engine cylinder of a split exhaust engine system.

Now turning to FIG. 4, graph 400 depicts example valve timings with respect to a piston position for an engine cylinder comprising four valves: two intake valves and two exhaust valves, such as described above with reference to FIGS. 1 and 2. The cylinder is configured to receive intake air via two intake valves (e.g., intake valves 2 and 4 shown in FIG. 1), exhaust a first, blowdown portion of exhaust gas to a turbine inlet via a first exhaust valve (e.g., first, or blowdown, exhaust valve 8 shown in FIG. 1), exhaust a second, scavenging portion of exhaust gas to an intake passage via a second exhaust valve (e.g., second, or scavenge, exhaust valve 6 shown in FIG. 1), and provide non-combusted blowthrough air to the intake passage via the second exhaust valve. By adjusting the timing of the opening and/or closing of the second exhaust valve with that of the two intake valves, residual exhaust gases in the cylinder clearance volume may be flushed out and recirculated as EGR along with fresh intake blowthrough air. Further, under select conditions, by further adjusting the timing of the opening and/or closing of one or more of the first exhaust valve, the second exhaust valve, and the two intake valves, in-cylinder pressure increases may be reduced, as further described further herein with respect to FIGS. 5-7.

Graph 400 illustrates an engine position along the X-axis in crank angle degrees (CAD).

In the example of FIG. 4, relative differences in timings can be estimated by the drawing dimensions. However, other relative timings may be used, if desired. Plot 402 depicts piston position (along the Y-axis) relative to top dead center (TDC), bottom dead center (BDC), and the four strokes of an engine cycle (intake, compression, power, and exhaust). During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is at its bottom-most position in the cylinder and at the end of its stroke (e.g., when the combustion chamber is at its largest volume) is typically referred to as bottom dead center (BDC). During the compression stroke, the intake valves and exhaust valves are closed. The piston moves toward the cylinder head so as to compress the air within the cylinder. The point at which the piston is at the end of its stroke and closest to the cylinder head (e.g., when the combustion chamber is at its smallest volume) is typically referred to as top dead center (TDC). In a process herein referred to as injection, fuel is introduced into the combustion chamber. In a process herein referred to as ignition, the injected fuel is ignited, such as via a spark from a spark plug, resulting in combustion. During the expansion stroke, the expanding gases push the piston back down to BDC. A crankshaft converts this piston movement into a rotational torque of the rotary shaft. During the exhaust stroke, the exhaust valves are opened to release the combusted air-fuel mixture to the corresponding exhaust passages, and the piston returns to TDC. In this description, the second exhaust (scavenge) valves may be opened after the beginning of the exhaust stroke and may stay open until after the end of the exhaust stroke, while the first exhaust (blowdown) valves are closed and the intake valves are opened to flush out residual exhaust gases with blowthrough air.

Plot 404 depicts an intake valve timing, lift, and duration for a first intake valve (Int 1), while plot 406 depicts an intake valve timing, lift, and duration for a second intake valve (Int 2), both intake valves coupled to the intake passage of the engine cylinder. Plot 408 depicts an example exhaust valve timing, lift, and duration for a first exhaust valve (Exh_1), which may correspond to first (e.g., blowdown) exhaust valve 8 shown in FIG. 1, coupled to a first exhaust manifold (e.g., blowdown exhaust manifold 84 shown in FIG. 1) of via a first exhaust runner (e.g., first exhaust runner 86 of FIG. 1). Plot 410 depicts an example exhaust valve timing, lift, and duration for a second exhaust valve (Exh_2), which may correspond to second (e.g., scavenge) exhaust valve 6 shown in FIG. 1, coupled to a scavenge manifold (e.g., scavenge manifold 80 shown in FIG. 1) via a second exhaust runner (e.g., second exhaust runner 82 of FIG. 1). As previously elaborated, the first exhaust manifold connects the first exhaust valve to the inlet of a turbocharger turbine, and the scavenge manifold connects the second exhaust valve to an intake passage via an EGR passage. The first exhaust manifold may be separate from the second scavenge manifold, as explained above.

In the depicted example, the first and second intake valves are fully opened from a closed position (e.g., a valve lift of zero) at a common timing (plots 404 and 406), beginning near intake stroke TDC just after CAD2 (e.g., at or just after intake stroke TDC), and are closed after a subsequent compression stroke has commenced past CAD3 (e.g., after BDC). Additionally, when opened fully, the two intake valves may be opened with a same amount of valve lift L1 for a same duration of D1. In other examples, the two intake valves may be operated with a different timing by adjusting the phasing, lift, or duration. Conversely, the timing of the first exhaust valve opening and closing is staggered relative to the second exhaust valve opening and closing. Specifically, the first exhaust valve (plot 408) is opened from a closed position at a first timing that is earlier in the engine cycle than the timing at which the second exhaust valve (plot 410) is opened from a closed position. Specifically, the first timing for opening the first exhaust valve is between TDC and BDC of the power stroke, before CAD1 (e.g., before exhaust stroke BDC), while the timing for opening the second exhaust valve is just after exhaust stroke BDC, after CAD1 but before CAD2. The first exhaust valve (plot 408) is closed before the end of the exhaust stroke, and the second exhaust valve (plot 410) is closed after the end of the exhaust stroke. Thus, the second exhaust valve remains open to overlap slightly with opening of the intake valves.

To elaborate, the first exhaust valve (plot 408) may be fully opened from close before the start of an exhaust stroke (e.g., between 90 and 40 degrees before BDC), maintained fully open through a first part of the exhaust stroke, and may be fully closed before the exhaust stroke ends (e.g., between 50 and 0 degrees before TDC) to collect the blowdown portion of the exhaust pulse. The second exhaust valve (plot 410) may be fully opened from a closed position just after the beginning of the exhaust stroke (e.g., between 40 and 90 degrees past BDC), maintained open through a second portion of the exhaust stroke, and may be fully closed after the intake stroke begins (e.g., between 20 and 70 degrees after TDC) to exhaust the scavenging portion of the exhaust. Additionally, the second exhaust valve and the intake valves, as shown in FIG. 4, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions.

Additionally, the first exhaust valve (plot 408) may be opened with a first amount of valve lift L2, while the second exhaust valve (plot 410) may be opened with a second amount of valve lift L3, where L3 is smaller than L2. Further still, the first exhaust valve may be opened at the first timing for a duration D2, while the second exhaust valve may be opened for a duration D3, where D3 is smaller than D2. It will be appreciated that in other examples, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in the cylinder) from residual exhaust gases at low pressure (e.g., exhaust gases that remain in the cylinder after blowdown) into the different manifolds. By conveying low pressure residual exhaust gases as EGR along with blowthrough air to the compressor inlet (via the EGR passage and the second scavenge manifold), combustion chamber temperatures can be lowered, thereby reducing an occurrence of knock and an amount of spark retard from maximum brake torque timing. Further, because the exhaust gases at the end of the exhaust stroke are directed to either downstream of the turbine or upstream of the compressor, which are both at lower pressures, exhaust pumping losses can be minimized to increase engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to increase turbocharger output. Additionally, fuel economy may be increased because blow-through air is not routed to the catalyst, being directed to the compressor inlet instead, and therefore, excess fuel may not be injected into the exhaust gases to maintain a stoichiometric air-fuel ratio upstream of the catalyst.

While the split exhaust manifold may increase engine efficiency and power while the engine is operated to produce torque (e.g., with combustion occurring in the engine cylinders), the configuration of the engine and an electric machine in a driveline (e.g., powertrain 200 shown in FIG. 3) may limit opportunities for regeneration, creep, and light launch by the electric machine. For example, as shown in FIG. 3, because the engine and the electric machine are not de-clutchable, the powertrain must be in-gear (e.g., at transmission 208 of FIG. 3) in order to use the electric machine (e.g., electric machine 240 of FIG. 3) for propulsion or regeneration, with the engine also spun at non-zero speeds, even if the engine is off (e.g., without combustion occurring in the engine cylinders). However, if the valve timings shown in FIG. 4 are used, even though fuel is not supplied and combustion does not occur at the engine, the engine cylinders may produce compression torque due to the compression and expansion of air within each cylinder while the intake and exhaust valves are closed during the compression and power strokes. At higher vehicle (and engine) speeds, the compression torque may not be noticeable, as it may be insignificant compared to the torque produced by the electric machine. However, at lower vehicle (and engine) speeds, the compression torque may produce a noticeable driveline oscillation that is uncomfortable to vehicle occupants.

Figure 5:
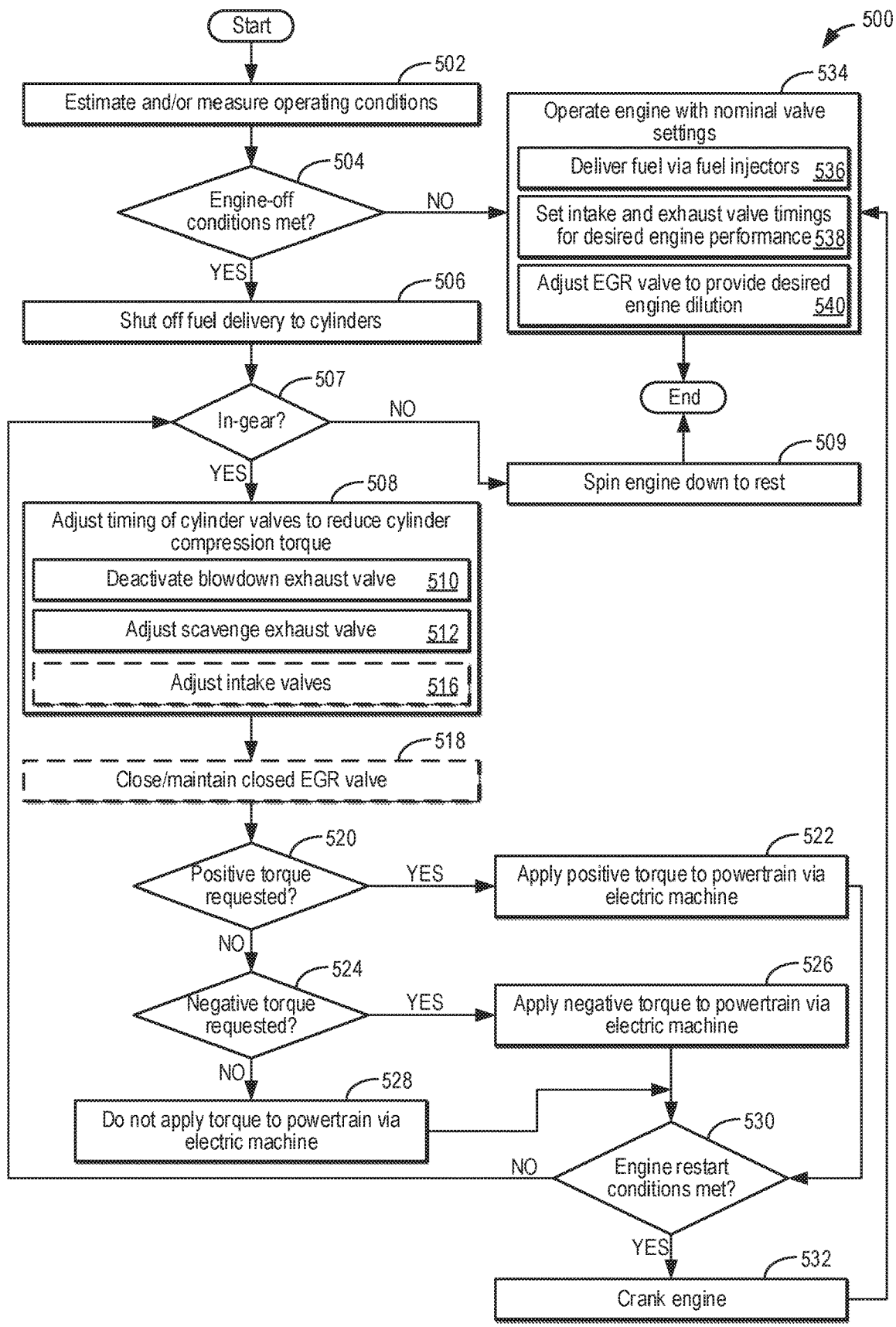
FIG. 5 shows an example method for reducing compression torque of an engine having a split exhaust system.

Therefore, FIG. 5 shows an example method 500 for reducing compression torque in a spinning, non-firing engine without pumping air through a downstream catalyst. Method 500 may be particularly beneficial at sub-idle speeds, when the compression torque may result in an undesirable vehicle feel, but may also be used to reduce engine motoring torque at higher (e.g., higher than idle) speeds. Specifically, method 500 includes utilizing a scavenge exhaust valve (e.g., second exhaust valve 6 of FIG. 1) and a scavenge manifold (e.g., second exhaust manifold 80 of FIG. 1) to both reduce in-cylinder pressure, thereby reducing or eliminating compression/expansion work, and prevent airflow to the catalyst (e.g., emission control devices 70 and/or 72 shown in FIG. 1). Instructions for carrying out method 500 and the rest of the methods included herein may be executed by a controller (e.g., controller 12 shown in FIGS. 1-3) based on instructions stored on a memory of the controller and in conjunction with signals received from sensors of the engine system, such as the sensors described above with reference to FIGS. 1-3. The controller may employ engine actuators of the engine system to adjust engine operation according to the methods described below.

At 502, method 500 includes estimating and/or measuring operating conditions. The operating conditions may include, for example, vehicle speed, a state of charge (SOC) of a system battery (e.g., energy storage device 275 of FIG. 3), engine status (e.g., on or off), engine load, engine temperature, engine speed, a torque demand, an accelerator pedal position (e.g., from an output of accelerator pedal position sensor 118 shown in FIG. 2), a brake pedal position (e.g., from an output of brake pedal position sensor 119 shown in FIG. 2), a boost demand, intake manifold pressure (MAP), a desired engine dilution and/or EGR flow rate, a selected transmission gear, a status of a torque converter (e.g., locked or unlocked), etc.

At 504, method 500 includes determining if engine-off conditions are met. The engine-off conditions may include the torque demand (e.g., desired wheel torque) being less than a maximum torque output of the electric machine and the battery SOC being greater than a threshold SOC. The threshold SOC may be a non-zero SOC below which the battery may be unable to support additional electrical loads of the vehicle (such as vehicle lights, climate control, electric power steering, etc.) while the engine is off and maintain enough electrical power for restarting the engine. Thus, the engine-off conditions include operating conditions where engine torque is not requested for vehicle propulsion or operation. For example, the requested engine torque may be less than a threshold torque. In one example, the threshold torque may be zero (e.g., engine torque is not requested). In other examples, the threshold torque may be a non-zero torque value that is less than the maximum torque output of the electric machine, such that the electric machine may be operated to provide the requested torque instead of the engine. In some examples, the engine-off conditions may further include one or more of the brakes being applied, the accelerator pedal not being depressed, the engine operating at an idle speed, and the vehicle speed being less than a threshold speed.

If the engine-off conditions are not met, such as when engine torque is demanded and/or the battery SOC is less than the threshold SOC, method 500 proceeds to 534 and includes operating the engine with nominal valve settings. Operating the engine with the nominal valve settings includes delivering fuel to the engine via fuel injectors (e.g., fuel injectors 66 shown in FIGS. 1 and 2), as indicated at 536, setting the intake and exhaust valve timings for a desired engine performance, as indicated at 538, and adjusting an EGR valve to provide a desired engine dilution, as indicated at 540.

For example, setting the intake and exhaust valve timings for a desired engine performance may include setting the intake and exhaust valve timings for the best achievable brake specific fuel consumption (BSFC) at the current engine operating conditions. In one example, this may include setting the timing of the scavenge exhaust valve, a blowdown exhaust valve (e.g., first exhaust valve 8 of FIG. 1), and intake valves (e.g., intake valves 2 and 4 of FIG. 1) of each cylinder at the timings shown in FIG. 4, as described above. In some examples, the timing of the exhaust valves and the intake valves may be adjusted from the timings shown in FIG. 4 based on engine speed and load. For example, the intake valve timing may be retarded at lighter engine loads and advanced when the engine is boost-limited or there is a request for increased blowthrough to reduce knock. In another example, the exhaust valve timings may be adjusted so that the exhaust valves open earlier as the engine speed increases and later as boost decreases (e.g., at low engine speed and high engine load conditions).

Adjusting the EGR valve to provide a desired engine dilution may include opening the EGR valve (e.g., EGR valve 54 of FIG. 1) in response to a request for EGR and blowthrough. EGR and blowthrough may be delivered to an intake passage of the engine upstream of a turbocharger compressor via the scavenge exhaust manifold and an EGR passage (e.g., first EGR passage 50 shown in FIG. 1). For example, if engine load is above a threshold load, EGR and blowthrough to the intake passage may be desired and enabled. As one example, the EGR valve may be opened in response to the engine being boosted (e.g., with the turbocharger compressor operating and resulting in MAP greater than atmospheric pressure).

Further, if more of less EGR flow or blowthrough to the intake passage via the scavenge manifold and EGR passage is desired relative to currently estimated levels (e.g., as estimated based on an output of a pressure sensor and/or oxygen sensor positioned in the scavenge manifold), the controller may adjust the positions or timings of one or more of the EGR valve, the scavenge exhaust valve, and the intake valves to achieve the desired EGR flow and blowthrough flow. For example, if increased EGR is desired, the controller may increase the opening of the EGR valve and/or advance the timing of the scavenge exhaust valve. If instead decreased EGR is desired, the controller may reduce the opening of the EGR valve and/or retard the scavenge exhaust valve timing. As another example, if increased blowthrough is desired, the controller may retard the scavenge exhaust valve timing, advance the intake valve timing, and/or increase the opening of the EGR valve. If decreased blowthrough is desired, the controller may advance the scavenge exhaust valve timing, retard the intake valve timing, and/or decrease the opening of the EGR valve. Further, each of the EGR valve position, the scavenge exhaust valve time, and the intake valve timing may be adjusted relative to one another to provide the desired EGR flow and blowthrough amount. Method 500 may then end.

Returning to 504, if the engine-off conditions are met, method 500 proceeds to 506 and includes shutting off fuel delivery to the cylinders. For example, fuel will not be injected into the cylinders by the fuel injectors. As such, the engine may be spun unfueled, without combustion occurring in the engine cylinders.

At 507, method 500 includes determining if the transmission is in-gear. For example, it may be determined that the transmission is in-gear when a forward or reverse gear is engaged at the transmission and a disconnect clutch (e.g., disconnect clutch 236 of FIG. 3) is engaged so that the engine and the electric machine are rotationally coupled to the transmission. In a first example, the transmission may remain in-gear for a deceleration fuel shut-off (DFSO) event, where fuel delivery is discontinued in response to a vehicle deceleration condition while the vehicle is operated at a non-zero speed. In a second example, the transmission may remain in-gear to enable electric creep, where the vehicle is propelled when the accelerator pedal is not depressed and a brake value (e.g., friction brakes 218 of FIG. 3) is not enough to hold the vehicle stationary (e.g., less than a threshold value, which may be a non-zero value that changes based on a gradient of a surface on which the vehicle is positioned). For example, the electric machine may be operated at a non-zero speed to provide torque for the electric creep even when torque is not demanded by the driver (e.g., via the accelerator pedal). In a third example, the transmission may remain in-gear while the engine is off (e.g., unfueled) during light launch, where the vehicle is propelled via (positive) torque from the electric machine in response to the vehicle operator depressing the accelerator pedal to request torque. In a fourth example, the transmission may remain in-gear while the engine is off for regenerative braking, where the vehicle is slowed via (negative) torque from the electric machine, such as in response to the vehicle operator depressing the brake pedal. Conversely, the transmission may not remain in gear during a stop-start event, where the engine is shut off while the engine the vehicle is stationary (e.g., during a static stop-start) or while the engine is idling and the vehicle is in motion (e.g., during a rolling stop-start). For example, the controller may shift the transmission to neutral during a stop-start event.

If the transmission is not in-gear, method 500 proceeds to 509 and includes spinning the engine down to rest. Without combustion occurring in the engine cylinders and the engine disconnected from the vehicle wheels, frictional loses and pumping work cause the engine speed to decrease until it reaches a speed of zero. Following 509, method 500 ends.

Returning to 507, if the transmission is in-gear, method 500 proceeds to 508 and includes adjusting the timing of the cylinder valves to reduce cylinder compression torque. Adjusting the timing of the cylinder valves includes deactivating a blowdown exhaust valve of each cylinder, as indicated at 510. As described above with respect to FIG. 1, gases that exit the cylinder via the blowdown exhaust valve are directed to a downstream catalyst. Therefore, by deactivating the blowdown exhaust valve (e.g., maintaining the blowdown exhaust valve closed, with zero lift throughout an entire engine cycle), gases (e.g., air) will not be pumped through the engine to the catalyst while the engine is spun unfired. Adjusting the timing of the cylinder valves includes adjusting the scavenge exhaust valve, as indicated at 512. As one example, adjusting the scavenge exhaust valve includes maintaining open the scavenge exhaust valve such that the scavenge exhaust valve is held in an open position, with non-zero lift, throughout the entire engine cycle. As another example, adjusting the timing of the scavenge exhaust valve includes opening the scavenge exhaust valve while the intake valve(s) are closed. For example, if the scavenge exhaust valve is not maintained open over the entire engine cycle, then the scavenge exhaust valve of each cylinder may be opened in response to the intake valve(s) closing so that at least one of the scavenge exhaust valve and the intake valve(s) is open throughout the entire engine cycle, thereby preventing or reducing in-cylinder pressure increases via compression. As still another example, adjusting the scavenge exhaust valve timing includes opening the scavenge exhaust valve during at least a compression stroke and an exhaust stroke, thereby reducing or preventing compression within the cylinder as the piston rises. In some examples, adjusting the timing of the cylinder valves includes operating the intake valve(s) with late intake valve closing (LIVC), as optionally indicated at 516. For example, the timing of the intake valve(s) may be set to maximum LIVC.

Figure 6:
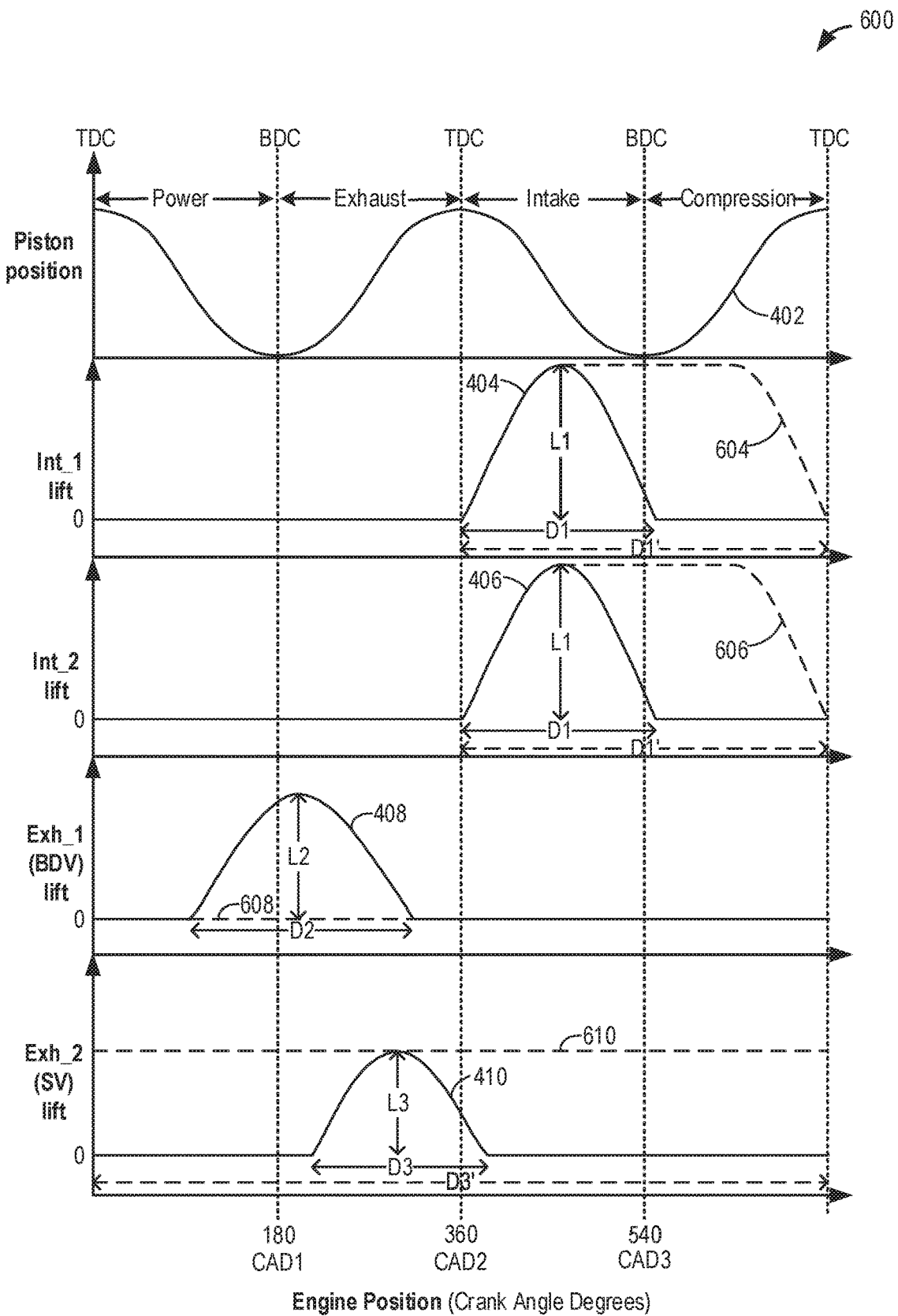
FIG. 6 shows a first example of adjustments to cylinder intake valve and exhaust valve timings for one engine cylinder of a split exhaust engine system for reducing engine compression torque.
Figure 7:
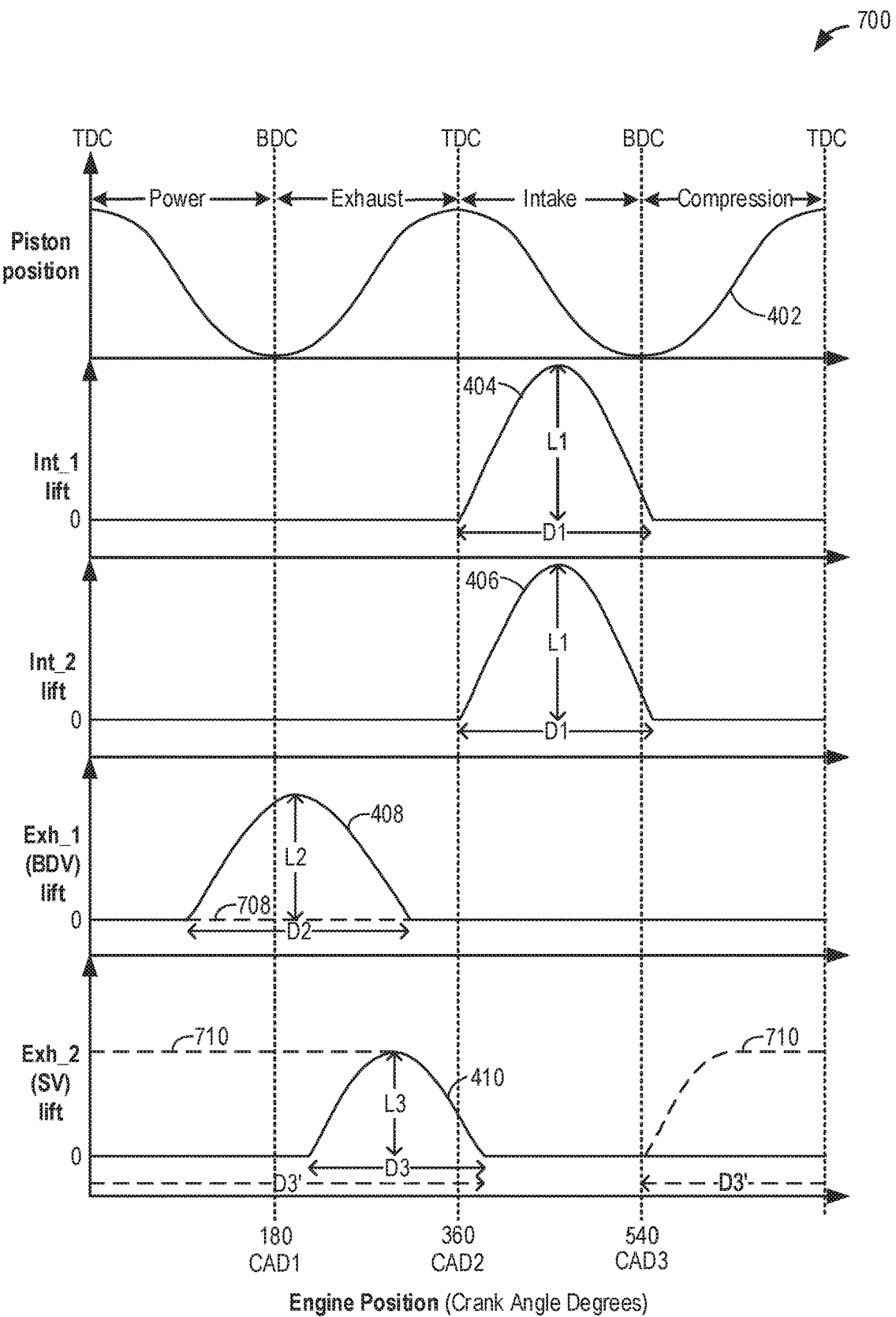
FIG. 7 shows a second example of adjustments to cylinder intake valve and exhaust valve timings for one engine cylinder of a split exhaust engine system for reducing engine compression torque.
Figure 8:
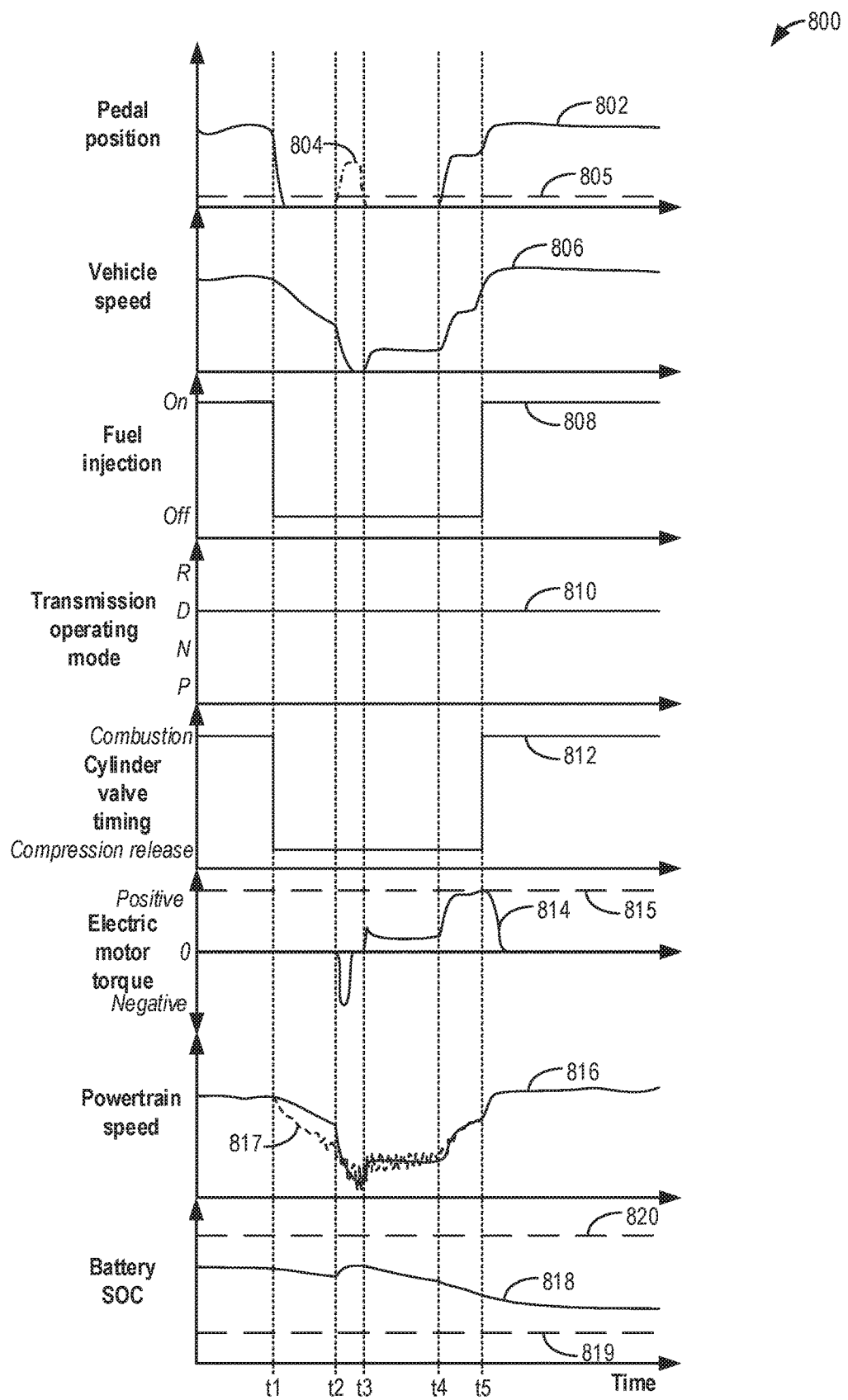
FIG. 8 shows a prophetic example timeline for adjusting cylinder valve timing while spinning an engine of a hybrid powertrain unfueled.

Turning briefly to FIGS. 6 and 7, example adjusted cylinder valve timings for reducing compression torque are shown with respect to piston position for an engine cylinder comprising four valves (two intake valves and two exhaust valves, such as described above with reference to FIGS. 1 and 2). Specifically, a graph 600 of FIG. 6 shows a first example of cylinder valve timing adjustments relative to the example nominal cylinder valve timings shown in FIG. 4, and a graph 700 of FIG. 7 shows a second example of cylinder valve timing adjustments relative to the example nominal cylinder valve timings described above with respect to FIG. 4. Further, although one engine cycle is shown, it should be understood that the engine cylinder may be operated with the adjusted cylinder valve timings from one engine cycle to the next, such as until different cylinder valve timings are commanded. Further still, FIGS. 6 and 7 depict the adjusted cylinder valve timings relative to the nominal valve timings and not the action of adjusting the cylinder valve timings from the nominal valve timings. FIGS. 6 and 7 illustrate two example adjusted cylinder valve timings for reducing compression torque within a cylinder, although other adjusted cylinder valve timings are also possible.

Turning first to FIG. 6, dashed plot 604 depicts an adjusted intake valve timing, lift, and duration for a first intake valve (Int_1), while dashed plot 606 depicts an adjusted intake valve timing, lift, and duration for a second intake valve (Int_2), both intake valves coupled to the intake passage of the engine cylinder. Dashed plot 608 depicts an a first example adjusted exhaust valve timing, lift, and duration for a first exhaust valve (Exh_l) (e.g., a blowdown exhaust valve, coupled to a blowdown manifold), and dashed plot 610 depicts a first example adjusted exhaust valve timing, lift, and duration for a second exhaust valve (Exh_2) (e.g., a scavenge exhaust valve, coupled to a scavenge manifold).

In the depicted example, the first and second intake valves are fully opened from a closed position (e.g., a valve lift of zero) at a nominal, common timing (plots 404 and 406), beginning near intake stroke TDC just after CAD2. In the first adjusted valve timing example shown in FIG. 6, the first and second intake valves are set to maximum LIVC, such as according to method 500 at 516 described above, and remain open until around TDC of the compression stroke (dashed plots 604 and 606). For example, the adjusted first and second intake valve valves are held open for a duration D1', which is longer than the duration D1 for the example nominal intake valve timing, lift, and duration (plots 404 and 406). Additionally, when opened fully, the two intake valves may be opened with a same, nominal amount of valve lift L1. The first exhaust valve (dashed plot 608) is maintained closed, at a valve lift of zero, such as described above at 510 of method 500. As such, the first exhaust valve does not have a non-zero amount of valve lift or an open duration. The second exhaust valve (dashed plot 610) is maintained open, at a nominal amount of valve lift L3, throughout the engine cycle, such as described above at 512 of method 500. For example, the second exhaust valve may remain open for a duration D3', which is greater than the nominal example duration D3 and corresponds to the entire engine cycle.

In this way, gases may exit the cylinder to the scavenge exhaust manifold via the open second exhaust valve as the piston rises to TDC during the exhaust stroke and may not exit the cylinder to the blowdown manifold. Further, gases may exit the cylinder to the intake passage via the open intake valves and to the scavenge manifold via the open second exhaust valve as the piston rises to TDC during the compression stroke and may not exit the cylinder to the blowdown manifold. Because the gases are not trapped in a sealed cylinder (e.g., having all of the intake and exhaust valves closed) as the piston rises to TDC, compression does not occur, and the in-cylinder pressure does not appreciably increase. As a result, the gases do not do work on the piston to force the piston back to BDC to produce torque.

Continuing to FIG. 7, the intake valve timings are not adjusted from the example nominal valve timings introduced in FIG. 4 (plots 404 and 406). In the second adjusted valve timing example shown in FIG. 7, the first exhaust valve (dashed plot 708) is maintained closed, at a valve lift of zero, such as described above at 510 of method 500. As such, the first exhaust valve does not have a non-zero amount of valve lift or an open duration, as in the first adjusted valve timing example shown in FIG. 6. The second exhaust valve (dashed plot 710) is fully opened (e.g., to the nominal amount of valve lift L3) from a closed position (e.g., a valve lift of zero) shortly after CAD3, such as in response to the intake valves closing, as described above at 512 of method 500. For example, the second exhaust valve may begin to open just before the intake valves are fully closed and may remain open until the nominal exhaust valve closing time introduced in FIG. 4 (plot 410). Thus, the timing of the second exhaust valve opening may be advanced, occurring before or during the compression stroke of a first engine cycle, and the second exhaust valve may remain open until after the exhaust stroke of a second, subsequent engine cycle. For example, the second exhaust valve may be closed in response to the first and second intake valves opening. As such, the second exhaust valve may remain open for a duration D3', which is greater than the nominal example duration D3. In some examples, such as shown in FIG. 7, the intake valves may begin to open before the second exhaust valve is fully closed.

In this way, gases may exit the cylinder to the scavenge exhaust manifold via the open second exhaust valve as the piston rises to TDC during both the exhaust stroke and the compression stroke. Further, gases may not exit the cylinder to the blowdown manifold. Because the gases are not trapped in a sealed cylinder (e.g., having all of the intake and exhaust valves closed) as the piston rises to TDC, compression does not occur, and the in-cylinder pressure does not appreciably increase. As a result, the gases do not do work on the piston to force the piston back to BDC to produce torque.

Returning to FIG. 5, at 518, method 500 optionally includes closing or maintaining closed (if already closed) the EGR valve. By closing the EGR valve, air pumped through the engine may not be recirculated. However, with the scavenge exhaust valve open, a clearance volume of the piston is so large that the cylinder cannot build enough pressure to produce compression and expansion work. For example, if the intake valve (or valves) is open during the compression stroke, such as shown in the example adjusted valve timing of FIG. 6, the EGR valve may be closed because the scavenge manifold would not be pressurized. Further, if the EGR system includes more than one EGR valve, such as the system shown in FIG. 1, then all of the EGR valves may be closed or maintained closed (e.g., both of first EGR valve 54 and second EGR valve 59). In addition, a hot pipe valve (e.g., third valve 32 of FIG. 1) and a scavenge manifold bypass valve (e.g., valve 97 of FIG. 1) may be closed or maintained closed such that airflow to the intake passage via the scavenge manifold is blocked and airflow to the catalyst via the scavenge manifold is blocked, respectively. However, in other examples, the EGR valve (e.g., first EGR valve 54) may remain at least partially open to enable recirculation of the air pumped through the engine while it is spun unfueled. For example, if the intake valve (or valves) is not opened during the compression stroke, such as shown in the example adjusted valve timing of FIG. 7, opening the EGR valve may prevent scavenge manifold pressurization. Therefore, the controller may make a determination of whether to close or open the EGR valve based on whether the intake valve is open during the compression stroke.

At 520, method 500 includes determining if positive electric machine torque is requested. For example, positive electric machine torque may be requested while the vehicle is operating in the electric creep mode or during light launch, for example. If positive electric machine torque is requested, method 500 proceeds to 522 and includes applying positive torque to the powertrain via the electric machine. Further, the controller may adjust the amount of positive torque provided by the electric machine based on an amount of torque requested, which may be determined in part based on the accelerator pedal position. For example, as the accelerator pedal position increases (e.g., becomes further depressed), the amount of torque requested increases, and the amount of positive torque provided by the electric machine increases. The controller may increase the positive torque provided by the electric machine by increasing an amount of power supplied to the electric machine, for example. In one example, the controller may input the amount of torque requested into a look-up table, algorithm, or map, which may output the corresponding amount of power to supply to the electric machine to produce the demanded positive torque.

If positive electric machine torque is not requested, method 500 proceeds to 524 and includes determining if negative electric machine torque is requested. For example, negative electric machine torque may be requested for regenerative braking to slow the rotation of the powertrain and convert kinetic energy into electrical energy. As an example, the vehicle may be operated in a regenerative braking mode in response to a braking event being present (e.g., as determined based on the brake pedal position).

If negative electric machine torque is requested, method 500 proceeds to 526 and includes applying negative torque to the powertrain via the electric machine. Further, the controller may adjust the amount of negative torque provided by the electric machine based on an amount of braking effort (e.g., negative wheel torque) requested, which may be determined in part based on the brake pedal position. For example, as the brake pedal position increases (e.g., becomes further depressed), the amount of braking effort requested increases, and the amount of negative torque provided by the electric machine increases. As another example, the amount of negative torque provided by the electric machine may be further adjusted based on a desired ratio of friction to regenerative braking (e.g., a fraction of the braking effort provided by friction brakes, such as friction brakes 218 shown in FIG. 3, relative to a fraction of the braking effort provided by the electric machine). For example, the controller may decrease the desired ratio of friction to regenerative braking in response to a signal from the system battery indicating that the battery is capable of accepting charge. Conversely, the controller may increase the desired ratio of friction to regenerative braking in response to the signal from the system battery indicating that the battery is not able to store additional charge (or has a reduced ability to store charge). For example, the battery may be capable of accepting charge when the battery is below a charge limit and may not be able to store additional charge when the battery is at the charge limit. The charge limit may include one or more of the SOC of the battery, an amount of battery current, an age of the battery, and/or a temperature of the battery. In one example, the battery may not be able to accept further charge, or may have a decreased ability to accept further charge, when the battery temperature is not within a threshold temperature range. The threshold temperature range may include a range of temperatures between an upper non-zero threshold temperature and a lower non-zero threshold temperature, the threshold temperature range defining nominal battery operating temperatures. As an example, the controller may input the amount of braking effort requested along with one or more of the SOC of the battery, the battery current, the age of the battery, and the battery temperature into one or more look-up tables, algorithms, and maps, which may then output the desired ratio of friction to regenerative braking. The controller may then operate the electric machine to provide the amount of negative torque to the powertrain to achieve the desired ratio of friction to regenerative braking for the requested braking effort.

If negative electric machine torque is not requested (e.g., no electric machine torque is requested), method 500 proceeds to 528 and includes not applying torque to the powertrain via the electric machine. For example, the engine may be unfired for a DFSO event that does not include applying positive or negative torque to powertrain via the electric machine. For example, the controller may not supply power to the electric machine. Thus, the powertrain, including the electric machine and the engine, may spin at a non-zero speed all the way down to zero engine speed during the DFSO event.

At 530, method 500 includes determining if engine restart conditions are met. The engine restart conditions may include, for example, the torque demand exceeding the maximum torque output of the electric machine and the battery SOC being less than the threshold SOC, as defined above at 504. As another example, the engine restart conditions may include the battery SOC decreasing at a rate that is greater than a threshold rate. The threshold rate may be a non-zero rate above which electrical loads of the vehicle may quickly deplete the battery SOC to less than the threshold SOC (e.g., within less than a non-zero threshold duration, such as a duration in a range from 30 seconds to 5 minutes). The engine restart conditions may be considered met in response to one of the engine restart conditions being present, for example.

If the engine restart conditions are not met, method 500 returns to 507 and includes determining if the transmission is in-gear. In this way, the engine may continue to be spun unfueled, with positive or negative torque provided to the powertrain to the electric machine as requested, until the engine restart conditions are met or until the transmission is no longer in gear, such as to place the vehicle in park, for example.

If the engine restart conditions are met, method 500 proceeds to 532 and includes cranking the engine. As one example, the engine may be cranked via a starter motor, such as starter motor 296 of FIG. 3. As another example, the engine may be cranked with the electric machine. Method 500 may then proceed to 534 to operate the engine with nominal valve settings, with fuel provided (e.g., at 536) to for combustion in the engine cylinders, as described above.

Thus, method 500 provides an example method for reducing powertrain oscillations while operating in an in-gear, engine-off condition via cylinder valve adjustments. As illustrated by examples herein, the method of operating and performing actions responsive to a determination of an in-gear, engine-off condition may include operating in that condition (e.g., operating with the vehicle traveling and the engine not combusting air and fuel), determining whether that condition is present (e.g., determining that the engine is not combusting air and fuel based on fuel injection being disabled) and performing actions in response thereto, as well as operating without that condition present (e.g., operating with the engine combusting air and fuel), determining that the condition is not present (e.g., determining that the engine is combusting air and fuel based on fuel being injected and the engine producing a positive torque output), and performing a different action in response thereto. For example, in response to operating in the in-gear, engine-off condition, the method may include adjusting cylinder valve timings to reduce in-cylinder pressure increases, and in response to not operating in the in-gear, engine off condition, the method may include adjusting the cylinder valve timings to produce torque via combustion. As an example, adjusting the cylinder valve timings to reduce in-cylinder pressure increases may include increasing an opening duration of scavenge exhaust valves coupled to a scavenge exhaust manifold, the scavenge exhaust manifold coupled to an intake of the engine. Increasing the opening duration may include one or more of holding the scavenge exhaust valves open during an entire engine cylinder, opening the scavenge exhaust valve during at least a compression and an exhaust stroke of a corresponding cylinder, and opening the scavenge exhaust valve while at least an intake valve of the corresponding cylinder is closed. As another example, adjusting the cylinder valve timings to reduce in-cylinder pressure increases may include retarding a closing timing of the intake valves. Further, in response to operating in the in-gear, engine-off condition, the method may further include fully closing blowdown exhaust valves coupled to a blowdown exhaust manifold, the blowdown exhaust manifold coupled to an emission control device, to prevent airflow through the emission control device. In contrast, adjusting the cylinder valve timings to produce torque via combustion may include opening the scavenge exhaust valve and the blowdown exhaust valve of each cylinder during the exhaust stroke and holding the scavenge exhaust valve and the blowdown exhaust valve closed during the compression stroke.

Next, FIG. 8 shows an example timeline 800 of operating a hybrid vehicle powertrain, such as powertrain 200 shown in FIG. 2, during various in-gear, engine-off conditions. For example, the powertrain may be transitioned between different in-gear, engine-off conditions as a driver demand changes, such as according to the example method of FIG. 5. Accelerator pedal position is shown in plot 802, brake pedal position is shown in dot dash plot 804, vehicle speed is shown in plot 806, fuel injection is shown in plot 808, transmission operating mode is shown in plot 810, cylinder valve timing is shown in plot 812, electric motor torque is shown in plot 814, powertrain speed is shown in plot 816, and battery SOC is shown in plot 818. For all of the above, the horizontal axis represents time, with time increasing along the horizontal axis from left to right. The vertical axis represents each labeled parameter. For plots 802, 804, 806, 816, and 818, the value of the labeled parameter increases along the vertical axis from bottom to top. For plot 814, the electric motor torque can be positive or negative and is shown relative to zero, with a value of the positive or negative torque increasing as a distance from zero decreases. For plot 808, the vertical axis shows whether fuel injection is on or off, as labeled. For plot 810, the vertical axis indicates whether the transmission is in reverse (R, with a reverse driving gear engaged), drive (D, with a forward driving gear engaged), neutral (N, with no gear engaged, disconnecting the transmission from drive wheels of the vehicle), or park (P, with an output shaft of the transmission locked), as labeled. For plot 812, the vertical axis represents whether the cylinder valve timing is selected for facilitating combustion (such as a nominal valve timing, an example of which is shown in FIG. 4) or for compression release (examples of which are shown in FIGS. 5 and 6).

Prior to time t1, a vehicle operator depresses the accelerator pedal (plot 802) to demand torque to operate the vehicle at a non-zero speed (plot 806). Fuel is delivered to the engine (plot 808), with the cylinder valves operated at a nominal valve timing for combustion (plot 812), in order to produce engine torque, which is transferred to drive wheel of the vehicles via the transmission, which is operated in drive (plot 810) in order to propel the vehicle forward. The electric motor torque is zero (plot 814) and is not used to provide torque to the powertrain, which operates at a non-zero speed (plot 817). Note that a torque converter lock-up clutch (e.g., torque converter lock-up clutch 212 of FIG. 3) is fully engaged throughout the example of timeline 800, and so the engine output torque (and any electric motor torque) is directly transferred to an input shaft of the transmission. Further, in the example of timeline 800, the powertrain speed generally increases as the vehicle speed increases and generally decreases as the vehicle speed decreases; however, in other examples, shifting gears at the transmission and/or at least partially disengaging the torque converter lock-up clutch may affect the relationship between the powertrain speed and the vehicle speed.

At time t1, the vehicle operator releases the accelerator pedal. Further, the battery SOC (plot 818) is greater than a lower threshold SOC (dashed line 819), below which the battery may be unable to support additional loads while the engine is off. In response, the vehicle enters a DFSO event, and fuel injection to the engine is stopped (plot 808) as the vehicle decelerates (plot 816). The transmission remains in drive (plot 810), and the cylinder valve timing is adjusted for compression release (plot 812). For example, a scavenge exhaust valve, coupled to a scavenge exhaust manifold that is further coupled to an intake of the engine via an EGR passage, may be maintained open while a blowdown exhaust valve, coupled to a blowdown exhaust manifold that routes exhaust to a turbine and a catalyst, is maintained closed. In this way, pressure may not build within each engine cylinder (e.g., during a compression stroke), and air does not flow through the catalyst.

With the cylinder valves operated with the compression release timing and combustion discontinued in the engine, the powertrain, including the engine and the electric machine, continues to rotate at a non-zero speed. The powertrain decreases during the DFSO event between time t1 and time t2 (plot 816). Due to operating with the compression release cylinder valve timing, engine pumping losses are reduced, and so the powertrain speed decreases more gradually (plot 818) than if the cylinder valve timing were to remain at a nominal timing for combustion, as shown by the more rapid speed decrease of dashed plot 817. Further, if the cylinder valve timing were to remain at a nominal timing for combustion, powertrain oscillations due to crankshaft acceleration and deceleration cycles would occur due to compression and expansion torque, particularly at lower engine (and powertrain speeds), as also shown in dashed plot 817. Instead, with the cylinder valves operated at the adjusted valve timing for compression release (and compression torque reduction), the powertrain speed decreases relatively smoothly, as shown in plot 816.

At time t2, the vehicle operator depresses the brake pedal. With the battery SOC (plot 818) less than an upper threshold SOC (dashed line 820), above which the battery may not be able to receive additional charge, the vehicle is operated in a regenerative braking mode to convert kinetic energy of the vehicle into electrical energy stored at the battery (e.g., energy storage device 275 of FIG. 3). The electric motor provides negative torque to the powertrain (plot 814) to further slow the powertrain (plot 816), and thus, the vehicle (plot 806). For example, the negative torque provided by the electric machine may be adjusted to provide a desired ratio of friction versus regenerative braking. Once the vehicle speed reaches zero, the vehicle is held at rest by friction brakes while the powertrain continues to rotate at a non-zero speed (plot 816) and the engine is spun unfueled (plot 808). With the cylinder valves operated at the compression release timing (plot 812), powertrain speed oscillations are greatly reduced compared with the cylinder valves remaining at the nominal timing for combustion, as illustrated by dashed segment 817.

At time t3, the vehicle operator releases the brake pedal beyond a threshold brake pedal position indicated by dashed line 805. In response, the vehicle is operated in an electric creep mode, and the electric motor provides positive torque to the powertrain (plot 814) to propel the vehicle at a low speed (plot 806), even though the accelerator pedal is not depressed (plot 802). The amount of positive torque supplied by the electric machine may be adjusted to operate the powertrain at a desired speed, such as a speed corresponding to an engine idle speed, for example.

At time t4, the vehicle operator depresses the accelerator pedal (plot 802). The vehicle is operated in a light launch mode, with the electric machine providing positive torque (plot 814) to propel the vehicle responsive to the driver demand. The engine continues to spin unfueled, with fuel injection off (plot 808), and the cylinder valve timing remains at the compression release timing (plot 812) so that compression and expansion torque of the unfired engine is reduced.

At time t5, the vehicle operator further depresses the accelerator pedal (plot 802). The electric motor torque (plot 814) reaches a torque threshold corresponding to a maximum torque output of the electric machine (dashed line 815). In response, the engine is restarted in order to meet the driver torque demand. To restart the engine, fuel injection is turned on (plot 808) and the cylinder valve timing is adjusted to a nominal timing for combustion (plot 812). As an amount of torque provided by the engine increases, the amount of electric motor torque provided by the electric machine decreases (plot 814) until the engine provides all of the torque to the powertrain and the electric motor torque reaches zero.

In this way, engine compression torque may be reduced while the engine is spun unfired during DFSO, regenerative braking, electric creep, and light launch. By enabling DFSO, regenerative braking, electric creep, and light launch while spinning the engine unfired at low engine speeds, fuel economy is increased while vehicle occupant disturbances are decreased by decreasing driveline oscillations. Further, by maintaining the blowdown exhaust valve closed, airflow to the catalyst is prevented, resulting in further fuel economy increases. Further still, the low speed regenerative braking enables additional opportunities for battery charging. Overall, vehicle occupant satisfaction may be increased due to fuel economy savings, emissions reductions, and low vehicle noise, vibration, and harshness.

The technical effect of maintaining closed a blowdown exhaust valve that couples a cylinder to an exhaust catalyst and opening a scavenge exhaust valve to reduce a pressure increase within the cylinder, the scavenge exhaust valve coupled to an EGR system, is that cylinder compression and expansion torque is reduced.

As one example, a method comprises: while rotating an engine unfueled at a non-zero speed, maintaining closed a first exhaust valve of a cylinder, the first exhaust valve coupled to a blowdown exhaust manifold coupled to an exhaust passage, and increasing an open duration of a second exhaust valve of the cylinder, the second exhaust valve coupled to a scavenge manifold coupled to an intake passage. In a first example of the method, increasing the open duration of the second exhaust valve includes maintaining open the second exhaust valve while intake valves of the cylinder are closed. In a second example of the method, which optionally includes the first example, increasing the open duration of the second exhaust valve includes maintaining open the second exhaust valve throughout an entire engine cycle. In a third example of the method, which optionally includes one or both of the first and second examples, increasing the open duration of the second exhaust valve includes opening the second exhaust valve during at least a compression stroke and an exhaust stroke of the cylinder. In a fourth example of the method, which optionally includes one or more or each of the first through third examples, the engine is included in a powertrain, and the engine is mechanically coupled to vehicle wheels via a transmission while rotating the engine unfueled at the non-zero speed. In a fifth example of the method, which optionally includes one or more or each of the first through fourth examples, the engine is rotationally coupled to an electric machine and the engine and the electric machine are not mechanically decouplable, and the non-zero speed is a rotational speed of the electric machine. In a sixth example of the method, which optionally includes one or more or each of the first through fifth examples, the electric machine provides torque to the powertrain while rotating the engine unfueled at the non-zero speed. A seventh example of the method optionally includes one or more or each of the first through sixth examples and further comprises adjusting an exhaust gas recirculation (EGR) valve to a fully closed position while rotating the engine unfueled at the non-zero speed, the EGR valve disposed within an EGR passage coupled to the scavenge manifold. An eighth example of the method optionally includes one or more or each of the first through seventh examples and further comprises operating intake valves of the cylinder with a closing timing set to a maximum late intake valve closing timing while rotating the engine unfueled at the non-zero speed.

As another example, a method for a vehicle comprises: in response to a less than threshold torque demand for an engine of the vehicle while the vehicle is operated at a non-zero speed and while the engine is rotated at a same speed as an electric machine: discontinuing fuel delivery to each cylinder of the engine while maintaining the engine coupled to vehicle wheels; deactivating a blowdown exhaust valve of each cylinder, the blowdown exhaust valve coupled to a first exhaust manifold coupled to an exhaust passage of the engine; and opening a scavenge exhaust valve of each cylinder at least while an intake valve of a same cylinder is closed, the scavenge exhaust valve coupled to an intake passage of the engine. A first example of the method further comprises retarding a closing timing of the intake valve of each cylinder. In a second example of the method, which optionally includes the first example, the blowdown exhaust valve, when open, couples the corresponding cylinder to an emission control device via the exhaust passage, and wherein the scavenge exhaust valve, when open, couples the corresponding cylinder to the intake passage of the engine via an exhaust gas recirculation (EGR) passage. A third example of the method optionally includes one or both of the first and second examples and further comprises fully closing a valve disposed in the EGR passage in response to the less than threshold torque demand for the engine of the vehicle while the vehicle is operated at the non-zero speed. In a fourth example of the method, which optionally includes one or more or each of the first through third examples, the engine is rotationally coupled to the electric machine in a powertrain, and wherein the less than threshold torque demand for the engine of the vehicle while the vehicle is operated at the non-zero speed includes operating in one of a deceleration fuel shut-off mode, a regenerative braking mode, an electric creep mode, and a light launch mode. In a fifth example of the method, which optionally includes one or more or each of the first through fourth examples, the electric creep mode and the light launch mode include providing positive torque to the powertrain via the electric machine, and the regenerative braking mode includes providing negative torque to the powertrain via the electric machine.

As another example, a system comprises: an engine configured to combust fuel and air within a plurality of cylinders, each cylinder including a first exhaust valve and a second exhaust valve; a blowdown exhaust manifold coupled to the first exhaust valve of each cylinder and an exhaust passage of the engine; a scavenge exhaust manifold coupled to the second exhaust valve of each cylinder and an intake passage of the engine; an electric machine rotationally coupled to the engine; and a controller storing executable instructions in non-transitory memory that, when executed, cause the controller to: deactivate the first exhaust valve and increase an open duration of the second exhaust valve while operating in an in-gear, engine-off condition while the engine is rotated at a rotational speed of the electric machine. In a first example of the system, the blowdown exhaust manifold is coupled to an exhaust passage upstream of a catalyst and the scavenge exhaust manifold is coupled an exhaust gas recirculation (EGR) passage, and the controller stores further instructions in non-transitory memory that, when executed, cause the controller to: maintain a valve disposed within the EGR passage fully closed while operating in the in-gear, engine-off condition to prevent recirculation via the EGR passage. In a second example of the system, which optionally includes the first example, the engine is included in a powertrain, the powertrain further including a transmission, and operating in the in-gear, engine-off condition includes shutting off fuel injection to the plurality of cylinders while a drive gear of the transmission is engaged. In a third example of the system, which optionally includes one or both of the first and second examples, the engine and the electric machine cannot be decoupled, and the controller stores further instructions in non-transitory memory that, when executed, cause the controller to: provide positive torque to the powertrain via the electric machine in response to operating in one of an electric creep mode and a light launch mode while operating in the in-gear, engine-off condition, an amount of the positive torque adjusted based on a position of an accelerator pedal; and provide negative torque to the powertrain via the electric machine in response to operating in a regenerative braking mode while operating in the in-gear, engine-off condition, an amount of the negative torque adjusted based on a position of a brake pedal. In a fourth example of the system, which optionally includes one or more or each of the first through third examples, the instructions that cause the controller to increase the open duration of the second exhaust valve while operating in the in-gear, engine-off condition include further instructions in non-transitory memory that, when executed, cause the controller to: open the second exhaust valve at least during a compression stroke and an exhaust stroke.

In another representation, a method comprises operating a vehicle in an in-gear, engine-off condition in response to engine shutdown conditions being met while a speed of the vehicle is greater than zero; and adjusting cylinder valve timings to reduce an in-cylinder pressure increase in response to operating the vehicle in the in-gear, engine-off condition. In the preceding example, additionally or optionally, operating the vehicle in the in-gear, engine-off condition includes one of a deceleration fuel shut-off condition, a regenerative braking condition, an electric creep condition, and a light launch condition. In any or all of the proceeding examples, additionally or optionally, the engine is coupled to a split exhaust system including a first exhaust manifold coupled to a catalyst and a second exhaust manifold coupled to an intake of the engine, and adjusting the cylinder valve timings to reduce the in-cylinder pressure increase includes increasing an open duration of a scavenge exhaust valve of each engine cylinder, the scavenge exhaust valve coupled to the scavenge exhaust manifold. In any or all of the preceding examples, additionally or optionally, adjusting the cylinder valve timings to reduce the in-cylinder pressure increase includes retarding a closing timing of an intake valve of each cylinder. In any or all of the preceding examples, additionally or optionally, the method further comprises fully closing a valve configured to control flow between the scavenge manifold and the intake of the engine in response to operating the vehicle in the in-gear, engine-off condition. In any or all of the preceding examples, additionally or optionally, while operating the vehicle in the in-gear, engine-off condition, an electric machine provides torque that rotates the engine at a non-zero speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
while rotating an engine unfueled at a non-zero speed, maintaining closed a first exhaust valve of a cylinder, the first exhaust valve coupled to a blowdown exhaust manifold coupled to an exhaust passage, and increasing an open duration of a second exhaust valve of the cylinder, the second exhaust valve coupled to a scavenge manifold coupled to an intake passage.

2. The method of claim 1, wherein increasing the open duration of the second exhaust valve includes maintaining open the second exhaust valve while intake valves of the cylinder are closed.

3. The method of claim 1, wherein increasing the open duration of the second exhaust valve includes maintaining open the second exhaust valve throughout an entire engine cycle.

4. The method of claim 1, wherein increasing the open duration of the second exhaust valve includes opening the second exhaust valve during at least a compression stroke and an exhaust stroke of the cylinder.

5. The method of claim 1, wherein the engine is included in a powertrain, and the engine is mechanically coupled to vehicle wheels via a transmission while rotating the engine unfueled at the non-zero speed.

6. The method of claim 5, wherein the engine is rotationally coupled to an electric machine and the engine and the electric machine are not mechanically decouplable, and wherein the non-zero speed is a rotational speed of the electric machine.

7. The method of claim 6, wherein the electric machine provides torque to the powertrain while rotating the engine unfueled at the non-zero speed.

8. The method of claim 1, further comprising adjusting an exhaust gas recirculation (EGR) valve to a fully closed position while rotating the engine unfueled at the non-zero speed, the EGR valve disposed within an EGR passage coupled to the scavenge manifold.

9. The method of claim 1, further comprising operating intake valves of the cylinder with a closing timing set to a maximum late intake valve closing timing while rotating the engine unfueled at the non-zero speed.

10. A method for a vehicle, comprising:
in response to a less than threshold torque demand for an engine of the vehicle while the vehicle is operated at a non-zero speed and while the engine is rotated at a same speed as an electric machine:
discontinuing fuel delivery to each cylinder of the engine while maintaining the engine coupled to vehicle wheels;
deactivating a blowdown exhaust valve of each cylinder, the blowdown exhaust valve coupled to a first exhaust manifold coupled to an exhaust passage of the engine; and opening a scavenge exhaust valve of each cylinder at least while an intake valve of a same cylinder is closed, the scavenge exhaust valve coupled to an intake passage of the engine.

11. The method of claim 10, further comprising retarding a closing timing of the intake valve of each cylinder.

12. The method of claim 10, wherein the scavenge exhaust valve, when open, couples the corresponding cylinder to the intake passage of the engine via an exhaust gas recirculation (EGR) passage.

13. The method of claim 12, further comprising, fully closing a valve disposed in the EGR passage in response to the less than threshold torque demand for the engine of the vehicle while the vehicle is operated at the non-zero speed.

14. The method of claim 10, wherein the engine is rotationally coupled to the electric machine in a powertrain, and wherein the less than threshold torque demand for the engine of the vehicle while the vehicle is operated at the non-zero speed includes operating in one of a deceleration fuel shut-off mode, a regenerative braking mode, an electric creep mode, and a light launch mode.

15. The method of claim 14, wherein the electric creep mode and the light launch mode include providing positive torque to the powertrain via the electric machine, and the regenerative braking mode includes providing negative torque to the powertrain via the electric machine.

16. A system, comprising:
an engine configured to combust fuel and air within a plurality of cylinders, each cylinder including a first exhaust valve and a second exhaust valve;
a blowdown exhaust manifold coupled to the first exhaust valve of each cylinder and an exhaust passage of the engine;
a scavenge exhaust manifold coupled to the second exhaust valve of each cylinder and an intake passage of the engine;
an electric machine rotationally coupled to the engine; and
a controller storing executable instructions in non-transitory memory that, when executed, cause the controller to:
deactivate the first exhaust valve and increase an open duration of the second exhaust valve while operating in an in-gear, engine-off condition while the engine is rotated at a rotational speed of the electric machine,
wherein the engine is included in a powertrain, the powertrain further including a transmission, and operating in the in-gear, engine-off condition includes shutting off fuel injection to the plurality of cylinders while a drive gear of the transmission is engaged.

17. The system of claim 16, wherein the blowdown exhaust manifold is coupled to the exhaust passage upstream of a catalyst and the scavenge exhaust manifold is coupled to an exhaust gas recirculation (EGR) passage, and the controller stores further instructions in the non-transitory memory that, when executed, cause the controller to:
maintain a valve disposed within the EGR passage fully closed while operating in the in-gear, engine-off condition to prevent recirculation via the EGR passage.

18. The system of claim 16, wherein the engine and the electric machine cannot be decoupled, wherein the non-zero speed is a rotational speed of the electric machine, and the controller stores further instructions in the non-transitory memory that, when executed, cause the controller to:
provide positive torque to the powertrain via the electric machine in response to operating in one of an electric creep mode and a light launch mode while operating in the in-gear, engine-off condition, an amount of the positive torque adjusted based on a position of an accelerator pedal; and
provide negative torque to the powertrain via the electric machine in response to operating in a regenerative braking mode while operating in the in-gear, engine-off condition, an amount of the negative torque adjusted based on a position of a brake pedal.

19. The system of claim 16, wherein the instructions that cause the controller to increase the open duration of the second exhaust valve while operating in the in-gear, engine-off condition include further executable instructions in the non-transitory memory that, when executed, cause the controller to:
open the second exhaust valve at least during a compression stroke and an exhaust stroke.

* * * * *